(12) United States Patent
Hirato et al.

(10) Patent No.: US 9,817,277 B2
(45) Date of Patent: Nov. 14, 2017

(54) LIQUID CRYSTAL DISPLAY DEVICE

(71) Applicant: Sharp Kabushiki Kaisha, Osaka-shi, Osaka (JP)

(72) Inventors: Shinichi Hirato, Osaka (JP); Isamu Miyake, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 202 days.

(21) Appl. No.: 14/361,352

(22) PCT Filed: Nov. 9, 2012

(86) PCT No.: PCT/JP2012/079159
§ 371 (c)(1),
(2) Date: May 29, 2014

(87) PCT Pub. No.: WO2013/080777
PCT Pub. Date: Jun. 6, 2013

(65) Prior Publication Data
US 2014/0354930 A1    Dec. 4, 2014

(30) Foreign Application Priority Data
Nov. 30, 2011    (JP) .................................. 2011-262528

(51) Int. Cl.
*G02F 1/1339* (2006.01)
*G02F 1/1337* (2006.01)

(52) U.S. Cl.
CPC ........ *G02F 1/13392* (2013.01); *G02F 1/1337* (2013.01); *G02F 1/13394* (2013.01);
(Continued)

(58) Field of Classification Search
CPC .............. G02F 1/13392; G02F 1/1337; G02F 1/133707; G02F 1/133788; G02F 1/13394;
(Continued)

(56) References Cited

U.S. PATENT DOCUMENTS 7,821,613 B2 * 10/2010 Kimura .................. B82Y 20/00
349/114
7,935,396 B2 * 5/2011 Matsumori ............ C08G 73/10
349/106
(Continued)

FOREIGN PATENT DOCUMENTS

JP    2002-182220 A    6/2002
JP    2004-206091 A    7/2004
(Continued)

OTHER PUBLICATIONS

Official Communication issued in International Patent Application No. PCT/JP2012/079159, dated Dec. 18, 2012.

*Primary Examiner* — Angela Davison
(74) *Attorney, Agent, or Firm* — Keating & Bennett, LLP

(57) ABSTRACT

The present invention provides a liquid crystal display device including a horizontal alignment type liquid crystal layer, sub spacers, and a photo-alignment film, wherein the liquid crystal display device can suppress the occurrence of a disclination. The present invention relates to a liquid crystal display device including: a pair of substrates facing each other; and a horizontal alignment type liquid crystal layer interposed between the pair of substrates, wherein at least one of the pair of substrates includes a photo-alignment film, one of the pair of substrates includes multiple sub spacers, the multiple sub spacers are not in contact with the facing substrate under atmospheric pressure, and each of the multiple sub spacers is formed such that its thickness in a cross section monotonically increases and then monotonically decreases from one end to another end of the sub spacer.

11 Claims, 9 Drawing Sheets

(52) U.S. Cl.
CPC .. *G02F 1/133707* (2013.01); *G02F 1/133788* (2013.01); *G02F 1/1339* (2013.01); *G02F 2001/13373* (2013.01); *G02F 2001/13396* (2013.01); *G02F 2001/133738* (2013.01)

(58) Field of Classification Search
CPC ......... G02F 1/133703; G02F 1/134363; G02F 1/133723; G02F 2001/13373; G02F 2001/133738; G02F 2001/13396; G02F 2001/13398; G02F 2001/133715; G02F 2001/133742; G02F 2001/133776; G02F 1/1339; G02F 2001/13394; G02F 1/13396; Y10T 14/361; Y10T 14/352; Y10T 428/1005; Y10T 428/10; Y10T 428/1023; Y10T 428/1018; Y10T 428/1027; C09K 19/56; C09K 19/544; C09K 2019/0448; C09K 2019/548; C09K 2019/543
USPC .. 349/42, 52, 86, 89, 92, 94, 123, 124, 132, 349/135, 183, 155–157
See application file for complete search history.

(56) References Cited

U.S. PATENT DOCUMENTS

| | | | | |
|---|---|---|---|---|
| 2001/0026347 | A1* | 10/2001 | Sawasaki | ......... G02F 1/133707 349/156 |
| 2002/0075443 | A1 | 6/2002 | Shimizu et al. | |
| 2006/0061719 | A1 | 3/2006 | Tomioka et al. | |
| 2007/0024797 | A1 | 2/2007 | Shimizu et al. | |
| 2008/0043179 | A1* | 2/2008 | Matsuoka | ......... G02F 1/133512 349/106 |
| 2008/0266511 | A1 | 10/2008 | Shimizu et al. | |
| 2009/0269515 | A1 | 10/2009 | Kataoka | |
| 2010/0118254 | A1* | 5/2010 | Hashimoto | ......... G02F 1/13394 349/155 |
| 2010/0225865 | A1 | 9/2010 | Tomioka et al. | |
| 2011/0058127 | A1 | 3/2011 | Toyooka | |
| 2011/0063553 | A1* | 3/2011 | Hanaoka | ........... G02F 1/133753 349/123 |
| 2011/0244379 | A1 | 10/2011 | Kajiyama et al. | |
| 2011/0261295 | A1* | 10/2011 | Kim | .................. G02F 1/133707 349/96 |
| 2011/0301324 | A1 | 12/2011 | Tomioka et al. | |

FOREIGN PATENT DOCUMENTS

| | | |
|---|---|---|
| JP | 2005-241858 A | 9/2005 |
| JP | 2009-265308 A | 11/2009 |
| JP | 2010-181687 A | 8/2010 |
| JP | 2010-197795 A | 9/2010 |
| JP | 2010-231198 A | 10/2010 |
| JP | 2011-186410 A | 9/2011 |
| JP | 2011-209539 A | 10/2011 |
| WO | 2010/070988 A1 | 6/2010 |

* cited by examiner (a)

(b)

(c)

LIQUID CRYSTAL DISPLAY DEVICE

TECHNICAL FIELD

The present invention relates to a liquid crystal display device. More specifically, the present invention relates to a liquid crystal display device suitable for a liquid crystal display device including a horizontal alignment type liquid crystal layer, sub spacers, and a horizontal photo-alignment film.

BACKGROUND ART

A liquid crystal display device (LCD) is a display device that controls the transmission/shielding of light (on/off of the display) by controlling the alignment of birefringent liquid crystal molecules (liquid crystal layer) interposed between two substrates. Examples of methods for aligning the liquid crystal molecules include a method in which an alignment film on which alignment treatment such as rubbing or photo-alignment has been performed is disposed on a substrate surface in contact with the liquid crystal layer.

According to another method, instead of performing alignment treatment, dielectric protrusions or electrode slits are provided as alignment controlling structures on an electrode so as to control the alignment of the liquid crystal molecules, as in the case of a multi-domain vertical alignment (MVA) mode. In the MVA mode, the alignment controlling structures allow the liquid crystal alignment to be controlled in multiple directions during voltage application. Thus, the MVA mode provides an excellent viewing angle characteristic, compared to the conventional mode such as a TA mode.

Further, in the liquid crystal display device, the thickness (cell gap) of the liquid crystal layer is preferably evenly maintained for achieving good display quality. Unevenness in the cell gap may cause display unevenness. A method for forming spacers on a substrate is known as a method for evenly maintaining the cell gap. Specifically, known examples of the method for forming the alignment controlling structures and the spacers include the use of a photomask capable of forming a photospacer having a stable height as well as an alignment controlling protrusion without a depressed portion on its top, using a negative photoresist (for example, see Patent Literature 1).

CITATION LIST

Patent Literatures

Patent Literature 1: JP-A 2010-181687

SUMMARY OF INVENTION

Technical Problem

The present inventors have been studying a photo-alignment technique that allows the liquid crystal alignment direction to be controlled in multiple directions during voltage application, without the need of rubbing on an alignment film, and that provides an excellent viewing angle characteristic. The photo-alignment technique is a technique of irradiating an alignment film, which is formed from a photoactive material, with light such as ultraviolet light, and thereby imparting an alignment regulating force to the alignment film. According to the photo-alignment technique, since alignment treatment can be performed on a film surface in a non-contact manner, the occurrence of contaminants, dust and the like during alignment treatment can be suppressed. In addition, unlike rubbing, the photo-alignment technique is also suitably applicable to large panels, and can also achieve excellent manufacturing yield. An alignment film formed by the photo-alignment technique is hereinafter also referred to as a photo-alignment film.

The current photo-alignment technique has been adopted mainly for the mass production of televisions in which a vertical alignment film is used (for example, a VA mode). The current photo-alignment technique has not been adopted for the mass production of televisions in which a horizontal alignment film is used (for example, an IPS mode). A horizontal alignment film formed by the photo-alignment technique (hereinafter also referred to as a horizontal photo-alignment film) has a weak alignment regulating force with respect to liquid crystal molecules. Thus, when an attempt is made to regulate the alignment of the liquid crystal molecules uniformly in a horizontal direction in the entire pixel, the horizontal photo-alignment film is easily affected by a force (disturbance) that tends to control the liquid crystal alignment in a direction different from the desired alignment direction. As a result, a liquid crystal alignment defect having a string-like shape as shown in FIG. 14 may occur, causing light leakage. Hereinafter, such a string-like alignment defect is also referred to as a disclination.

The present inventors examined the cause for the occurrence of the disclination, and as a result, found that the disturbance that occurs around sub spacers causes such a disclination. The spacers for evenly maintaining the cell gap (hereinafter also referred to as main spacers) are usually provided on one of a pair of substrates, and ends of these spacers are in contact with the other substrate (facing substrate) under atmospheric pressure. On the other hand, the sub spacers are provided on the one of the pair of substrates, and these sub spacers are not in contact with the other substrate (facing substrate) under atmospheric pressure. Providing these sub spacers on the substrate makes it possible to reduce the deformation of the glass caused by, for example, pressure from pressing the liquid crystal panel.

With reference to FIGS. 15 to 17, the cause for the occurrence of a disclination is described. FIG. 15 is a schematic cross-sectional view showing the occurrence of a disclination in a liquid crystal display device according to a comparative embodiment examined by the present inventors. FIG. 16 is a schematic plan view showing the occurrence of a disclination in a traverse direction in the liquid crystal display device according to the comparative embodiment examined by the present inventors. FIG. 17 is a schematic plan view showing the occurrence of a disclination in a longitudinal direction in the liquid crystal display device according to the comparative embodiment examined by the present inventors. It should be noted that FIGS. 16 and 17 are schematic views visualizing the inside from the color filter substrate side to the liquid crystal interface, excluding members that are irrelevant to the occurrence of the disclination. As shown in FIG. 15, the liquid crystal display device according to the comparative embodiment includes a horizontal alignment type liquid crystal layer 130 interposed between a color filter substrate 110 and an active matrix substrate 120. The liquid crystal layer 130 contains liquid crystal molecules 108. The color filter substrate 110 includes an insulating substrate 102. Color filters (not shown) and a BM 104 are formed on the insulating substrate 102, on the side facing the liquid crystal layer 130. Sub spacers 105 and main spacers (not shown) are formed on the BM 104. Further, a horizontal photo-alignment film 107 is formed so as to cover these members. It should be noted that although the horizontal photo-alignment film 107 may be provided on the sub spacers 105 as shown in FIG. 15, it is usually not formed on the sub spacers 105 or is formed in minute amounts on the sub spacers 105. A linear polarizer 112 is provided on the insulating substrate 102, on the side opposite to the liquid crystal layer 130. The active matrix substrate 120 includes an insulating substrate 101. Pixel electrodes (not shown), a common electrode 103, and a horizontal photo-alignment film 106 that covers these members are formed on the insulating substrate 101, on the side facing the liquid crystal layer 130. A linear polarizer 111 is provided on the insulating substrate 101, on the side opposite to the liquid crystal layer 130.

The present inventors found that although each sub spacer 105 included in the liquid crystal display device according to the comparative embodiment generally has a protruding shape (projecting shape) as shown in FIG. 15, the distal end of the sub spacer has a dent (depressed portion). Herein, in the vicinity of the depressed portion, the liquid crystal molecules 108 are not aligned horizontally to the substrates. Instead, the liquid crystal molecules 108 are aligned so as to create an arc along the shape of the depressed portion. As a result, as shown in FIG. 15, an alignment defect in which the liquid crystal molecules 108 are aligned in a rounded pattern so as to create a sphere occurs in the vicinity of the depressed portion. Such liquid crystal molecules 108 being aligned in a rounded pattern are considered to form a core of a disclination. It is considered that when an alignment defect at one sub spacer 105 is connected to another alignment defect at the adjacent sub spacer 105 as shown in FIGS. 16 and 17, it results in the occurrence of a display defect that is recognized as a disclination. FIGS. 16 and 17 show a case where a direction connecting the nearest adjacent sub spacers 105 (left-to-right direction in FIGS. 16 and 17) is parallel to the initial alignment direction of the liquid crystal molecules 108. Nevertheless, the disclination occurs similarly in the case where these directions are perpendicular to each other.

The applicant of the present application has suggested in the earlier application (Japanese Patent Application No. 2011-185045) that the occurrence of a disclination can be suppressed if an angle formed between a line connecting the spacers with a shorter inter-spacer distance than other inter-spacer distance(s) and an alignment direction of the liquid crystal molecules at a voltage lower than a threshold voltage in the liquid crystal layer is 20° or smaller. The invention according to the earlier application also sufficiently suppresses the occurrence of a disclination between the nearest adjacent sub spacers; yet, it is desired to further suppress the occurrence of a disclination between the nearest adjacent sub spacers, in view of enhancing the display quality. In addition, for example, as shown in FIG. 17, a disclination can occur between the sub spacers 105 that are not the nearest adjacent sub spacers 105. Yet, the invention according to the earlier application may not be able to sufficiently suppress such a disclination and thus has a room for improvement in this respect.

The present invention is made in view of the current situation described above, and aims to provide a liquid crystal display device including a horizontal alignment type liquid crystal layer, sub spacers, and a photo-alignment film, wherein the liquid crystal display device can suppress the occurrence of a disclination.

Solution to Problem

As a result of various studies on a liquid crystal display device including a horizontal alignment type liquid crystal layer, sub spacers, and a photo-alignment film, wherein liquid crystal display device can suppress the occurrence of a disclination, the present inventors placed their focus on the shape of the sub spacer. Consequently, they found that the distal end of each sub spacer has a depressed portion as described above in the liquid crystal display device according to the comparative embodiment, and that an alignment disturbance that occurs at the depressed portion leads to the occurrence of a disclination with the disturbance as the core. The present inventors made further extensive studies on the shape of the sub spacer. As a result, they found that if the sub spacer is formed such that its thickness in a cross section monotonically increases and then monotonically decreases from one end to another end of the sub spacer, it can prevent the formation of a depressed portion in the sub spacer (particularly, at the distal end) and can also smoothen the distal end, thus resulting in the suppression of the occurrence of an alignment defect that forms a core of a disclination at the distal end of the sub spacer. The present inventors found that the above finding can successfully solve the above problem, and accomplished the present invention.

In other words, one aspect of the present invention relates to a liquid crystal display device including: a pair of substrates facing each other; and a horizontal alignment type liquid crystal layer interposed between the pair of substrates, wherein at least one of the pair of substrates includes a photo-alignment film, one of the pair of substrates includes multiple sub spacers, the multiple sub spacers are not in contact with the facing substrate under atmospheric pressure, and each of the multiple sub spacers is formed such that its thickness in a cross section monotonically increases and then monotonically decreases from one end to another end of the sub spacer (hereinafter such a liquid crystal display device is also referred to as a first liquid crystal display device of the present invention).

The present inventors conducted further extensive studies, and as a result, found that the occurrence of a disclination can be suppressed even when a depressed portion is formed at the distal end of the sub spacer, as long as the depth of the depressed portion is shallow and an alignment disturbance does not easily occur at the depressed portion. The present inventors found that the above finding can successfully solve the above problem, and accomplished the present invention.

In other words, another aspect of the present invention relates to a liquid crystal display device including: a pair of substrates facing each other; and a horizontal alignment type liquid crystal layer interposed between the pair of substrates, wherein at least one of the pair of substrates includes a photo-alignment film, one of the pair of substrates includes multiple sub spacers, the multiple sub spacers are not in contact with the facing substrate under atmospheric pressure, and each of the multiple sub spacers is formed such that its thickness in a cross section monotonically increases up to a first point, monotonically decreases from the first point to a second point, monotonically increases from the second point to a third point, and then monotonically decreases from the third point, in a range from one end to another end of the sub spacer. An angle formed between a line segment connecting the first point and the second point and a line segment connecting the second point and the third point is at least 168° (hereinafter such a liquid crystal display device is also referred to as a second liquid crystal display device of the present invention).

In the first and second liquid crystal display devices of the present invention, each of the pair of substrate includes an insulating substrate and a member provided on the insulating substrate. Usually, one of the substrates functions as an active matrix substrate, and the other functions as a color filter substrate.

The above-mentioned cross section refers to a cross section perpendicular to the substrate on which the multiple sub spacers are provided. Preferably, the cross section cuts through the center portion of the sub spacer. In the first and second liquid crystal display devices of the present invention, as long as each sub spacer has at least one cross section in which the thickness of the sub spacer changes as described above, the number of such cross sections is not particularly limited. For example, the thickness of each sub spacer may change as descried above in two or more mutually intersecting cross sections of the sub spacer.

In the first and second liquid crystal display devices of the present invention, the thickness of the sub spacer monotonically increases or monotonically decreases in the following manner. First, the Cartesian coordinate system is applied to the cross section. The direction to the right, which is parallel to the substrate on which the multiple sub spacers are provided, is defined as the positive x-axis. The upward direction perpendicular to the x-axis (i.e., the direction toward the liquid crystal layer) is defined as the positive z-axis. Next, an optionally given point on the profile line of the sub spacer is represented by two coordinates $(x, z)$. That "the thickness of the sub spacer monotonically increases" means that if $x1<x2$, then $z1 \leq z2$. That "the thickness of the sub spacer monotonically decreases" means that if $x1<x2$, then $z1 \geq z2$. In this manner, the shape of each of the multiple sub spacers usually has a protruding shape (projecting shape) without a depressed portion. It should be noted that the protruding shape may include a partially flattened portion.

Patent Literature 1 discloses an alignment controlling protrusion without a depressed portion on its top. An object of the prior art disclosed in Patent Literature 1 is to solve a problem relating to the alignment controlling protrusion. Unlike the present application, Patent Literature 1 nowhere states or suggests a problem associated with a liquid crystal display device including a horizontal alignment type liquid crystal layer, sub spacers, and a photo-alignment film, regarding the fact that a certain shape of the sub spacer is more likely to result in the formation of a core of a disclination.

In the first and second liquid crystal display devices of the present invention, the liquid crystal layer contains liquid crystal molecules. The liquid crystal molecules may consist of one type of liquid crystal molecules, or plural types of liquid crystal molecules may be mixed. The liquid crystal layer may be a mixture of plural types of liquid crystal molecules for at least one of the following purposes: ensuring reliability; improving the response speed; and adjusting the liquid crystal phase temperature range, other elastic constants, anisotropy of dielectric constant, and refractive index anisotropy. In addition, the liquid crystal molecules in the liquid crystal layer may have either positive anisotropy of dielectric constant (positive type) or negative anisotropy of dielectric constant (negative type).

In the first and second liquid crystal display devices of the present invention, the horizontal alignment type liquid crystal layer is a liquid crystal layer containing the liquid crystal molecules that are controlled by the photo-alignment film to be aligned substantially horizontally to the substrate surface during non-voltage application. Thus, in the first and second liquid crystal display devices of the present invention, the photo-alignment film is a horizontal photo-alignment film. The liquid crystal layer usually has a pretilt angle of 0° or more and 0.5° or less. In the case where a horizontal alignment film on which alignment treatment has been performed by rubbing is used, the liquid crystal layer usually has a pre-tilt angle of 0.5° or more and 5° or less.

The configurations of the first and second liquid crystal display devices of the present invention are not particularly limited as long as they essentially include those components described above.

Preferred embodiments of the first and second liquid crystal display devices of the present invention are described below. The embodiments of the first and second liquid crystal display devices of the present invention can be employed in appropriate combination.

In a preferred embodiment, the first and second liquid crystal display devices of the present invention further include a polymer layer that is formed by polymerization of a monomer contained in the liquid crystal layer and that has an alignment regulating force, on the liquid crystal layer side of the photo-alignment film (hereinafter, such an embodiment is also referred to as a first embodiment). Since the horizontal photo-alignment film has a weak alignment regulating force, image sticking may occur in a conspicuous manner; however, the occurrence of image sticking can be suppressed by forming a polymer layer having an alignment regulating force. The image sticking is a phenomenon resulting from continuous application of the same amount of voltage to a liquid crystal cell for a certain period of time, in which brightness appears different between a portion to which voltage was continuously applied and a portion to which voltage was not applied. In addition, if a disclination is present during formation of the polymer layer, the disclination may be immobilized by the polymer layer; however, the present invention can suppress the occurrence of a disclination, and thus immobilization of a disclination is less likely to be induced by the formation of the polymer layer. A technique to stabilize the alignment using a polymer as described above is also referred to as a polymer sustained alignment (PSA) technique.

The polymer layer is a polymerized product of a monomer contained in the liquid crystal layer. Usually, the polymer layer controls the alignment of liquid crystal molecules adjacent to the polymer layer. The polymerizable functional group of the monomer is not particularly limited. Yet, in particular, an acrylate group and/or a methacrylate group is preferred. These polymerizable functional groups are highly likely to generate radicals, and are thus effective in reducing manufacturing cycle time. In addition, the monomer preferably includes at least two polymerizable functional groups because the reaction efficiency is higher when the number of polymerizable functional groups is larger. Further, the maximum number of polymerizable functional groups in the monomer is preferably four, so that the molecular weight is sufficiently reduced and the monomer can thus be easily dissolved in liquid crystal. In addition, the monomer is preferably a monomer that initiates polymerization by light irradiation (i.e., photopolymerization) or a monomer that initiates polymerization by heating (i.e., thermal polymerization). In other words, the polymer layer is preferably formed by photopolymerization or thermal polymerization. Photopolymerization is particularly preferred because the polymerization reaction can be easily initiated at normal temperature. The light used for photopolymerization is preferably ultraviolet light, visible light, or a combination thereof.

In the first embodiment, the type of polymerization reaction to form the polymer layer is not particularly limited, and examples thereof include step-growth polymerization in which a bifunctional monomer is polymerized stepwise while forming a new bond; and chain polymerization in which a monomer undergoes chain growth as it is sequentially bonded to active species generated from a small amount of catalyst (initiator). Examples of the step-growth polymerization include polycondensation and polyaddition. Examples of the chain polymerization include radical polymerization and ionic polymerization (for example, anionic polymerization and cationic polymerization).

The polymer layer can improve the alignment regulating force of the horizontal photo-alignment film on which alignment treatment has been performed, and can reduce the occurrence of image sticking in display. In addition, if a monomer is polymerized to form a polymer layer by applying no voltage or by applying a voltage below a threshold voltage to the liquid crystal layer in a state where the liquid crystal molecules are aligned at a pre-tilt angle, the resulting polymer layer will have a structure that allows the liquid crystal molecules to be aligned at a pre-tilt angle with respect to the polymer layer.

The substrate on which the multiple sub spacers are provided further includes multiple main spacers, and the multiple main spacers are in contact with the facing substrate under atmospheric pressure. Each of the multiple sub spacers has a bottom (circular bottom) diameter of preferably 80% or more of a bottom (circular bottom) diameter of each of the multiple main spacers. When forming the main spacers, it is preferred to use a photoresist to form the main spacers and the sub spacers at the same time. At this point, the smaller the sub spacer in size relative to the main spacer, the less exposed a portion corresponding to the sub spacer in the photoresist is to light, and thus a depressed portion may be formed in the sub spacer. Conventionally, the bottom diameter of the sub spacer was sometimes set to about 75% of the bottom diameter of the main spacer. The maximum ratio between the two bottoms mentioned above is not particularly limited. Yet, the bottom (circular bottom) diameter of each of the multiple sub spacers is usually set to 100% or less of the bottom (circular bottom) diameter of each of the multiple main spacers because the aperture ratio will decrease if it is set to more than 100%.

An alignment film material to form the photo-alignment film preferably includes at least one photoreactive functional group selected from the group consisting of a chalcone group, a coumarin group, a cinnamato group, an azobenzene group, and a stilbene group. These photoreactive functional groups can be relatively easily introduced into the side chain of the polymer, and exhibit excellent reactivity during photo-alignment treatment.

In addition, the photoreactive functional group may be appropriately modified with a modifying group. For example, a benzene ring of a cinnamato group may be modified with at least one group selected from the group consisting of fluorine, an alkyl group, an alkoxy group, a benzyl group, a phenoxy group, a benzoyl group, a benzoate group, and a benzoyloxy group. Moreover, a derivative of a monomer including the photoreactive functional group and a derivative of a monomer including the photoreactive functional group modified with a modifying group may be used to form a polymer as the alignment film material. Use of the alignment film material including the above modifying group or the alignment film material formed from the above derivative can improve electrical properties and alignment stability.

A preferred embodiment of the present invention is that an alignment film material to form the photo-alignment film includes a cyclobutane skeleton in a repeating unit (hereinafter such an embodiment is also referred to as a second embodiment). The alignment film material including a cyclobutane skeleton exhibits an alignment-controlling ability through photodissociation. Yet, usually, the light energy of light (for example, ultraviolet light) used to irradiate the alignment film material during alignment treatment is high, so that the main chain of the structure forming the alignment film, color filters, and the like may also undergo photodissociation, thus impairing the long-term reliability. On the other hand, in the first embodiment of the present invention, the polymer layer can assist the alignment-controlling ability of the photo-alignment film. Thus, the light energy of the light used to irradiate the alignment film material during alignment treatment can be relatively reduced. As a result, it is possible to suppress damage to the alignment film itself, color filters, and the like caused by light irradiation. Usually, light of a wavelength of around 254 nm is used to react (align) a photodissociable alignment film material. In contrast, in the case of the PSA technique, light of a wavelength of 313 nm or longer can be used to photopolymerize a monomer contained in the liquid crystal layer. Thus, it can be considered that irradiation with light for photopolymerization of a monomer will not deteriorate the alignment-controlling ability of the photo-alignment film that has been already irradiated with light. On the other hand, usually, light of a wavelength of around 313 nm is used to react (align) an alignment film material including the photoreactive functional group. Thus, in the case of using the photo-alignment film material including the photoreactive functional group, attention must be paid to the irradiation energy and the like so that the photo-alignment film itself will not be deteriorated during light irradiation for photopolymerization of a monomer. In this respect, the photodissociable photo-alignment film material including a cyclobutane skeleton is more advantageous than the photo-alignment film material including the photoreactive functional group. In view of the above, it is preferred to combine the second embodiment with the first embodiment. Yet, even when the second embodiment is not combined with the first embodiment, the second embodiment can still achieve an effect of suppressing a disclination to a similar degree as in the case where the photoreactive functional group is used. Thus, the technical significance of the second embodiment is high.

The photo-alignment film may be a horizontal photo-alignment film to which light (for example, ultraviolet light) is emitted from the outside of the liquid crystal cell. In this case, if the photo-alignment film is formed by photo-alignment treatment and the polymer layer is formed by photopolymerization in the first embodiment, the photo-alignment film and the polymer layer are preferably formed at the same time using the same light. In other words, alignment treatment on the photo-alignment film and formation of the polymer layer through photopolymerization of a monomer in the liquid crystal layer are preferably carried out at the same time by emitting light (for example, ultraviolet light) from the outside of the liquid crystal cell. This provides a liquid crystal display device with high production efficiency.

The photo-alignment film preferably includes a main chain structure of at least one polymer selected from the group consisting of polyimides, polyamic acids, polymaleimides, and polysiloxanes. The photo-alignment film including these main chain structures (particularly, the photo-alignment film mainly including these polymers) is advantageous in that it has high stability to heat, light, chemicals, and the like, and is thus less likely to suffer from deterioration of the alignment film.

In the case where only one of the pair of substrates includes the photo-alignment film, the substrate including the photo-alignment film may be either one of the pair of substrates. Thus, in this case, between the pair of substrates, the one without the multiple sub spacers may or may not include the photo-alignment film. Still, it is preferred that each of the pair of substrates includes the photo-alignment film. In the case where each substrate includes the photo-alignment film, various matters such as materials and alignment conditions can be suitably set for each photo-alignment film independently. Yet, usually, these matters are common between these photo-alignment films.

The display mode of the first and second liquid crystal display devices of the present invention is preferably an in-plane switching (IPS) mode or a fringe field switching (FFS) mode. The present invention is suitable to these display modes in which a horizontal electric field is generated. The liquid crystal display device of the IPS mode is a liquid crystal display device of a horizontal electric field mode in which, usually, one of the pair of substrates includes two types of electrodes that are opposed to each other in the plan view of the substrate main surface. In addition, the liquid crystal display device of the FFS mode is a liquid crystal display device of a fringe electric field mode in which, usually, one of the pair of substrates includes a planar electrode and a slit electrode (an electrode having a slit) disposed in a layer different from a layer including the planar electrode, with an insulation layer between these layers. These liquid crystal display devices are described in further detail in embodiments.

In addition, liquid crystal display devices of a ferroelectric liquid crystal (FLC) mode and an anti-ferroelectric Liquid Crystal (AFLC) mode also have a wide viewing angle and a high response speed, and these devices have been the subjects of research and development. Since these modes similarly require the liquid crystal molecules to be horizontally aligned, preferred display modes of the first and second liquid crystal display devices of the present invention also include the FLC mode and the AFLC mode.

One of the pair of substrates preferably includes a color filter. In this case, the substrate including the color filter may be either one of the pair of substrates. Thus, the substrate including the multiple sub spacers may or may not include the color filter.

One of the pair of substrates preferably includes an IGZO-TFT. In this case, the substrate including the IGZO-TFT may be either one of the pair of substrates. Thus, the substrate including the multiple sub spacers may or may not include the IGZO-TFT. The IGZO-TFT refers to a TFT including a semiconductor layer formed from indium-gallium-zinc-oxygen (IGZO).

Advantageous Effects of Invention

The present invention provides a liquid crystal display device including a horizontal alignment type liquid crystal layer, sub spacers, and a photo-alignment film, wherein the liquid crystal display device can suppress the occurrence of a disclination.

DESCRIPTION OF EMBODIMENTS

The present invention will be described below in more detail with reference to the drawings in the following embodiments, but is not limited to these embodiments.

Embodiment 1

Figure 1:
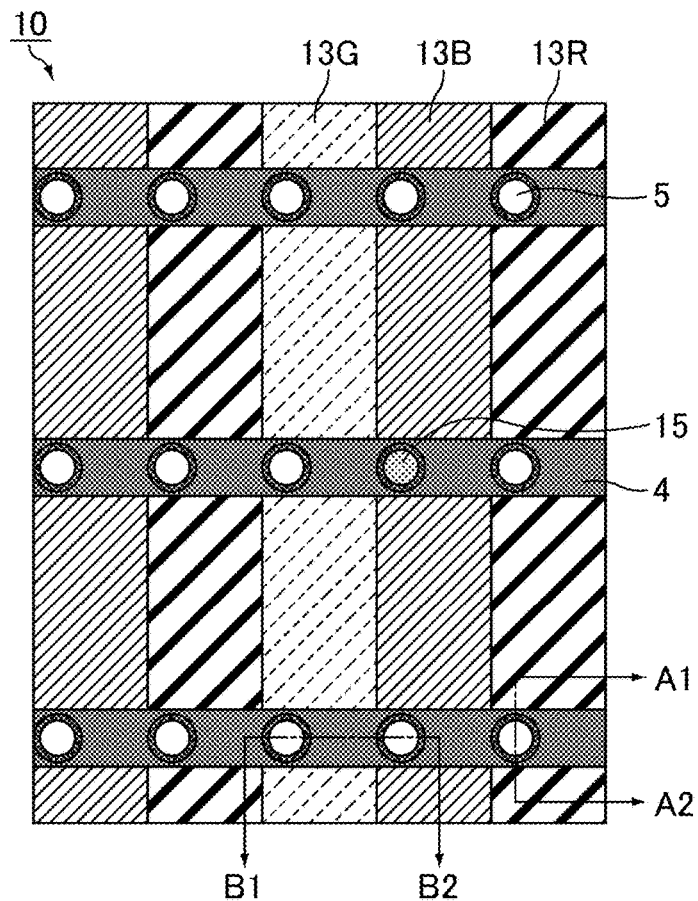
FIG. 1 is a schematic plan view showing a color filter substrate included in a liquid crystal display device according to Embodiment 1.
Figure 2:
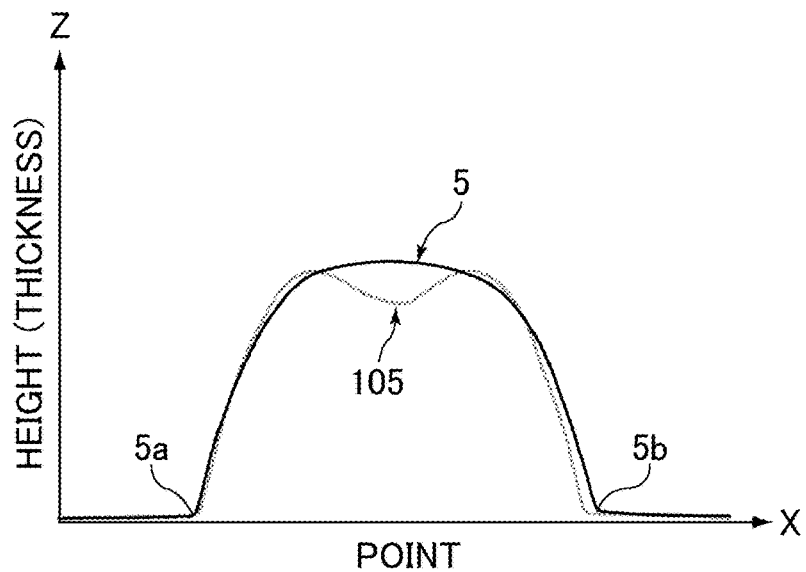
FIG. 2 is a schematic cross-sectional view showing a sub spacer included in a liquid crystal display device according to Embodiment 1, and a sub spacer included in a liquid crystal display device according to a comparative embodiment.
Figure 3:
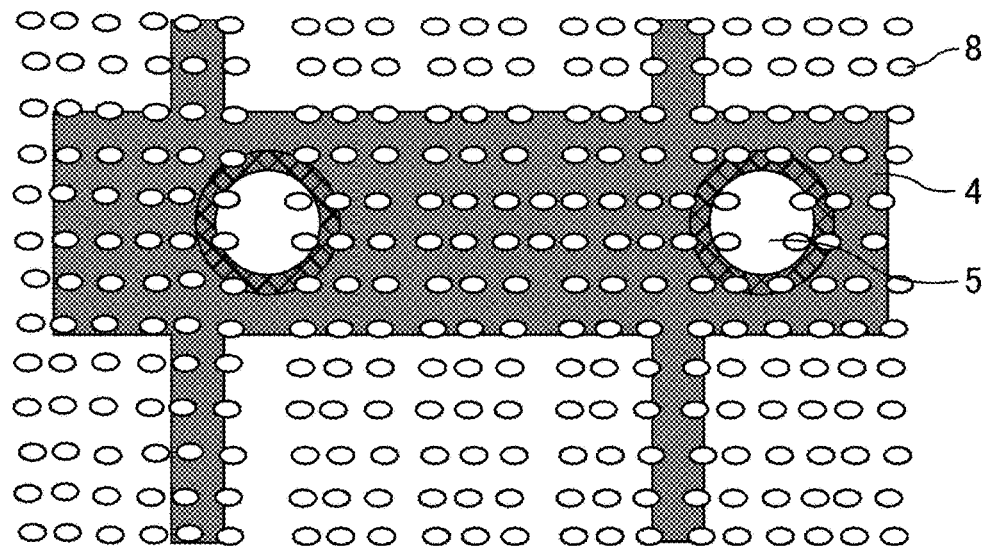
FIG. 3 is an enlarged schematic plan view showing two sub spacers and their vicinities in the liquid crystal display device according to Embodiment 1.
Figure 4:
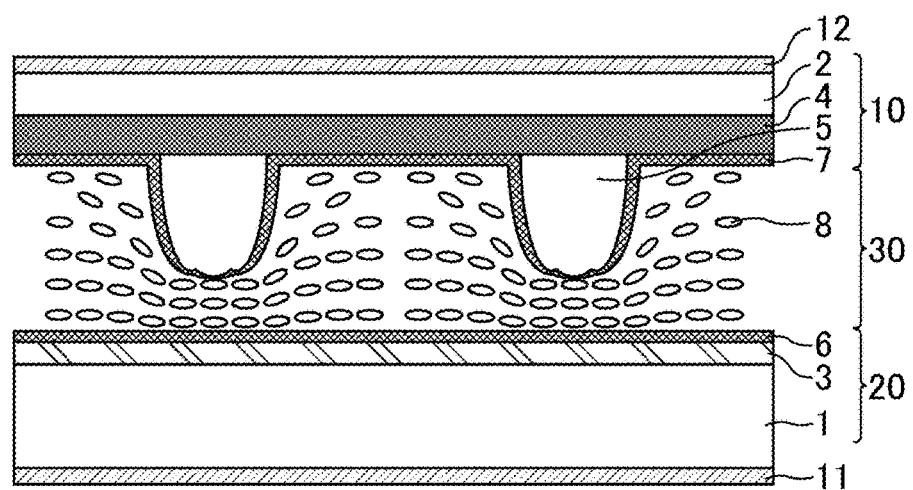
FIG. 4 is a schematic cross-sectional view showing a portion of the entire liquid crystal display device, which corresponds to a section taken along line segment B1-B2 in FIG. 1.

With reference to FIGS. 1 to 4, a liquid crystal display device according to Embodiment 1 is described in detail. FIG. 1 is a schematic plan view showing a color filter substrate included in the liquid crystal display device according to Embodiment 1. FIG. 2 is a schematic cross-sectional view of a sub spacer included in the liquid crystal display device according to Embodiment 1 and a sub spacer included in a liquid crystal display device according to a comparative embodiment. The schematic cross-sectional view of a sub spacer included in the liquid crystal display device according to Embodiment 1 shown in FIG. 2 corresponds to a schematic cross-sectional view taken along line segment A1-A2 in FIG. 1. FIG. 3 is an enlarged schematic plan view showing two sub spacers and their vicinities in the liquid crystal display device according to Embodiment 1. Further, FIG. 4 is a schematic cross-sectional view showing a portion of the entire liquid crystal display device, which corresponds to a section taken along line segment B1-B2 in FIG. 1.

As shown in FIG. 1, the color filter substrate included in the liquid crystal display device according to Embodiment 1 is configured such that any one of a red color filter 13R, a blue color filter 13B, and a green color filter 13G is arranged in each subpixel. A black matrix (BM) 4 is arranged at the boundaries of the subpixels, and sub spacers 5 and main spacers 15 are arranged on the BM 4. The sub spacers 5 are arranged on almost all subpixels, except for some subpixels. The main spacers 15 are arranged on the subpixels on which the sub spacers 5 are not arranged. As described, the arrangement is made such that the number of the sub spacers 5 is higher than the number of the main spacers 15. The sub spacers 5 are not in contact with a facing active matrix substrate under atmospheric pressure, whereas the distal ends of the main spacers 15 are in contact with the facing active matrix substrate under atmospheric pressure.

As shown in FIG. 2, the sub spacer 105 included in the liquid crystal display device according to the comparative embodiment has a dent (depressed portion) at its distal end. In contrast, the sub spacer 5 is configured such that, in a cross section (usually, a cross section cutting through the center portion of the sub spacer 5) that is perpendicular to the color filter substrate (substrate main surface), the thickness (height of a point on the profile line) of the sub spacer 5 monotonically increases and then monotonically decreases from one end 5a to another end 5b. In other words, the sub spacer 5 does not have a depressed portion at its distal end. In FIG. 2, the sub spacer 5 is formed in a rounded projecting shape.

In addition, as shown in FIG. 3, the occurrence of an alignment defect that forms a core of a disclination is suppressed at the distal end of the sub spacer 5. Thus, the occurrence of a disclination is suppressed.

As described above, according to one aspect, the present invention provides a liquid crystal display device including a substrate having sub spacers, wherein each sub spacer is formed in a projecting shape having a rounded distal end without a depressed portion at the distal end.

It should be noted that FIG. 3 shows a case where a direction connecting the nearest adjacent sub spacers 5 (left-to-right direction in FIG. 3) is parallel to the initial alignment direction of liquid crystal molecules 8; however, the present embodiment does not impose any particular limitation on the relationship between a direction connecting the nearest adjacent sub spacers 5 and the initial alignment direction of the liquid crystal molecules 8. For example, also in the cases where these directions are perpendicular to each other, and where these directions obliquely intersect each other, the present embodiment can still suppress the occurrence of a disclination.

With reference to FIG. 4, the liquid crystal display device according to Embodiment 1 is described in further detail. The liquid crystal display device according to Embodiment 1 includes a horizontal alignment type liquid crystal layer 30 interposed between a color filter substrate 10 and an active matrix substrate 20 (these substrates correspond to the pair of substrates). The liquid crystal layer 30 includes the liquid crystal molecules 8 (nematic liquid crystal). The color filter substrate 10 includes a transparent insulating substrate 2 such as a glass substrate. The color filters (not shown in FIG. 4) and the BM 4 are formed on the insulating substrate 2, on the side facing the liquid crystal layer 30. The sub spacers 5 and the main spacers (not shown in FIG. 4) are formed on the BM 4. Further, a horizontal photo-alignment film 7 is formed so as to cover these members. It should be noted that although the horizontal photo-alignment film 7 may be provided on the sub spacers 5 as shown in FIG. 4, it is usually not formed on the sub spacers 5 or is formed in minute amount on the sub spacers 5. A linear polarizer 12 is provided on the insulating substrate 2, on the side opposite to the liquid crystal layer 30. The active matrix substrate 20 includes a transparent insulating substrate 1 such as a glass substrate. Various types of wiring, thin film transistors (TFT, not shown in FIG. 4) that function as switching elements, pixel electrodes (not shown in FIG. 4), a common electrode 3, and a horizontal photo-alignment film 6 that covers these members are formed on the insulating substrate 1, on the side facing the liquid crystal layer 30. A linear polarizer 11 is provided on the insulating substrate 1, on the side opposite to the liquid crystal layer 30. The linear polarizers 11 and 12 each may further include a retarder to form a circular polarizer.

The liquid crystal display device according to Embodiment 1 may have a color-filter-on-array structure in which the color filters are provided on the active matrix substrate 20. In addition, the liquid crystal display device according to Embodiment 1 may be a monochrome display. In this case, it is unnecessary to form the color filters. Further, the sub spacers 5 and the main spacers 15 may be formed on the active matrix substrate 20 instead of the color filter substrate 10.

Figure 5:
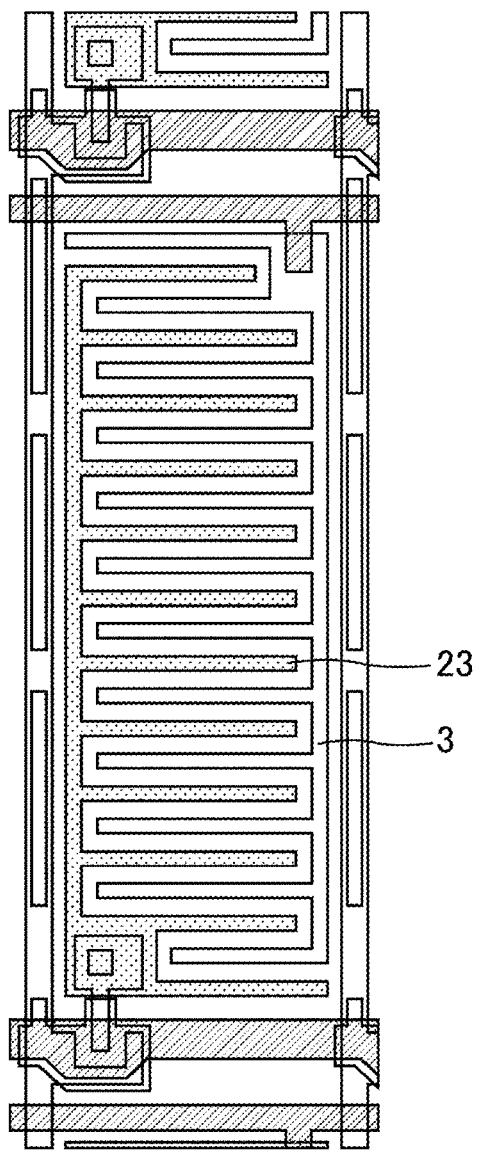
FIG. 5 is a schematic plan view showing an active matrix substrate included in the liquid crystal display device of an IPS mode according to Embodiment 1.
Figure 6:
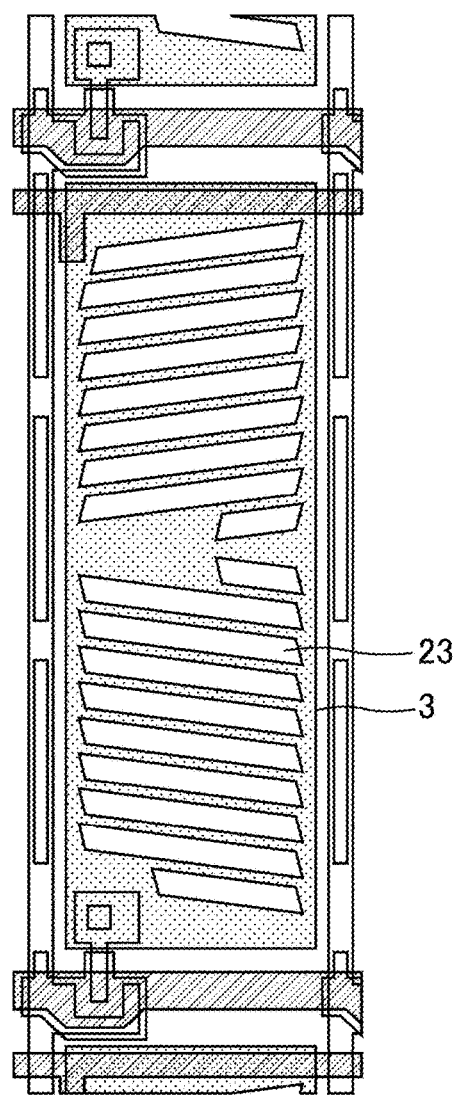
FIG. 6 is a schematic plan view showing an active matrix substrate included in the liquid crystal display device of an FFS mode according to Embodiment 1.

The shapes and arrangement of the pixel electrodes and the common electrode 3 are different depending on the display mode of the liquid crystal display device. FIG. 5 is a schematic plan view showing an active matrix substrate included in the liquid crystal display device of the IPS mode according to Embodiment 1. FIG. 6 is a schematic plan view showing an active matrix substrate included in the liquid crystal display device of the FFS mode according to Embodiment 1. As shown in FIG. 5, for example, in the case of the IPS mode, both of the pixel electrode 23 and the common electrode 3 are combteeth electrodes, and these electrodes are formed on the same layer or different layers. As shown in FIG. 6, in the case of the FFS mode, the pixel electrode 23 and the common electrode 3 are formed on different layers via an insulating layer. One of the electrode 23 and the common electrode 3 is formed with apertures and the other electrode is formed at a certain position so as to cover the apertures. One of these electrodes having apertures is arranged on the upper layer and the other electrode is arranged on the lower layer. In FIG. 6, the pixel electrode 23 is formed with apertures and the common electrode 3 is formed so as to cover the display area including the apertures. Preferably, the apertures are slits.

The display mode of the liquid crystal display device according to Embodiment 1 is not particularly limited to the IPS mode or the FFS mode. The present invention is applicable to other known modes in which the horizontal alignment film is used. For example, an FLC mode and an AFLC mode are also suitable.

Further, as described above, the active matrix substrate 20 includes thin film transistors (TFT) and various types of wiring (for example, gate bus lines, source bus lines, and storage capacitor wiring lines). The pixel electrode 23 and the common electrode 3 can be formed from publicly known materials such as indium tin oxide (ITO) and indium zinc oxide (IZO).

Any material such as amorphous silicon and polysilicon can be used for a semiconductor layer in the TFT included in the active matrix substrate 20. Yet, it is preferred to use an oxide semiconductor having a high mobility, such as indium-gallium-zinc-oxygen (IGZO). The use of IGZO can reduce the size of each TFT element, compared to the case where amorphous silicon is used. Thus, the use of IGZO is suitable for a high-definition liquid crystal display. In particular, IGZO is preferably used in a system for which high response speed is required, as in the case of a field sequential color system.

The method for forming the sub spacer 5 according to Embodiment 1 is not particularly limited, but usually, a photoresist is used to form the sub spacer 5. The type of the photoresist is not particularly limited, and it may be either a positive or negative photoresist. Yet, it is preferred to use a negative photoresist, for example, to obtain a sub spacer diameter (bottom diameter of the sub spacer) that corresponds to a pixel size of a liquid crystal panel for a mobile device. As a result of studies, the present inventors found that in the case where a negative photoresist is used to form the sub spacer, even when the same halftone mask is used, the size of the sub spacer will be different if there are changes in conditions such as the intensity of light to irradiate the mask and the proximity gap. The present inventors also found that in the case where the size (particularly volume) of the sub spacer is small relative to that of the main spacer, the sub spacer tends to shrink due to post-baking, and consequently, the depressed portion is easily formed. Therefore, in order to suppress the formation of the depressed portion, it is important to prevent the sub spacer from becoming too small in size (particularly in volume) relative to the main spacers. The relative size (particularly volume) of the sub spacers can be changed, for example, by a method for changing exposure conditions such as the amount of light exposure, intensity of light to irradiate the mask, proximity gap, and transmittance of the halftone mask. For example, in some cases, shrinkage during post-baking can be suppressed by increasing the transmittance of mesh for a halftone mask used to form the sub spacer and thereby increasing the amount of light exposure. More specifically, for example, Patent Literature 1 discloses the use of a halftone mask having a transmittance of 10 to 15% during formation of alignment controlling protrusions using a negative photoresist; however, in Embodiment 1, the transmittance of a halftone mask used to form the sub spacer 5 is set to 12 to 18% to increase the transmittance, thus increasing the amount of light exposure and improving the shape of a recess. In addition, examples of other methods for ensuring the relative size (particularly volume) of the sub spacer and thus suppressing the formation of the depressed portion include a method for increasing or decreasing the intensity of light to irradiate the mask, and a method for increasing the proximity gap. In the case where a photoresist is used, the corners of the sub spacer 5 will be rounded, not angular.

In addition, the sub spacer 5 is so small that it is difficult to form the horizontal photo-alignment film 7 particularly on its distal end, and thus it is difficult to regulate the alignment particularly at the distal end. Therefore, in view of suppressing a disclination, it is preferred to reduce the area of the upper base of the sub spacer 5, i.e., to approximate the shape of the sub spacer 5 to a projecting shape.

In FIG. 1, the sub spacer 5 has a circular bottom in the plan view of the color filter substrate. Yet, the shape of the bottom of the sub spacer 5 is not particularly limited to the circular shape. For example, the bottom may have a polygonal shape (such as a rhombic or octagonal shape) or an elliptical shape. The absolute size of the bottom of the sub spacer 5 is not particularly limited, but the size of the bottom of the sub spacer 5 relative to that of the main spacer 15 is preferably set as follows: in the case where the sub spacer 5 and the main spacer 15 both have circular bottoms, the bottom diameter of the sub spacer 5 is preferably set to 80% or more of the bottom diameter of the main spacer 15 in view of effectively suppressing the occurrence of a disclination, and is preferably set to 100% or less in view of preventing a reduction in the aperture ratio.

The thickness (height) of the sub spacer 5 is not particularly limited. Yet, the difference in height between the main spacer 15 and the sub spacer 5 is usually 0.2 μm or more and 1 μm or less, and is preferably 0.6 μm.

Figure 7:
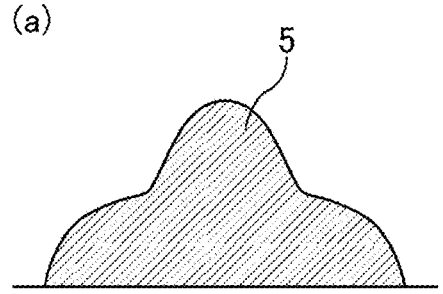
FIGS. 7(a) to 7(c) are schematic views showing examples of cross sectional shapes of the sub spacers included in the liquid crystal display device according to Embodiment 1.
Figure 7:
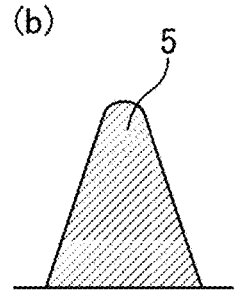
Figure 7:
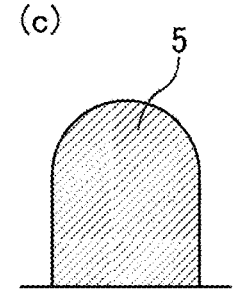
Figure 8:
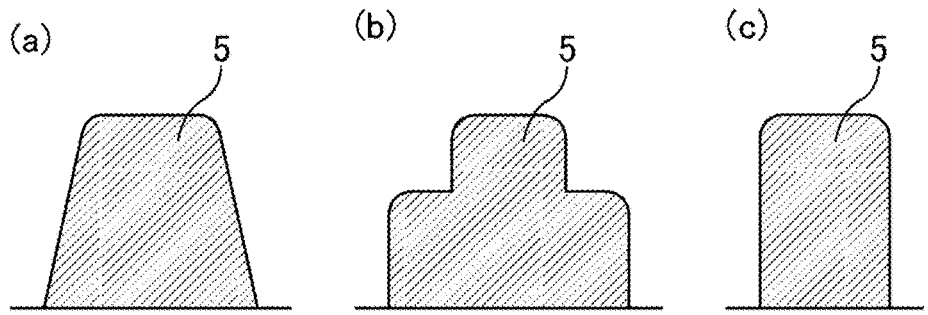
FIGS. 8(a) to 8(c) are schematic views showing other examples of cross sectional shapes of the sub spacers included in the liquid crystal display device according to Embodiment 1.
Figure 9:
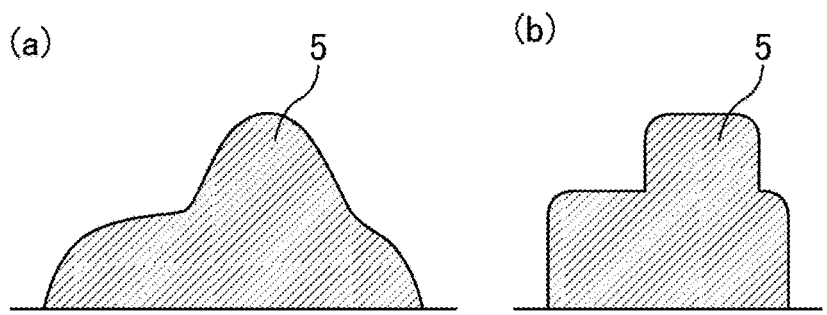
FIGS. 9(a) and 9(b) are schematic views showing still other examples of cross sectional shapes of the sub spacers included in the liquid crystal display device according to Embodiment 1.

FIGS. 7 to 9 are schematic views each showing examples of cross sectional shapes of the sub spacers included in the liquid crystal display device according to Embodiment 1. The shape of the sub spacer 5 according to Embodiment 1 is not particularly limited to the one shown in FIG. 2 as long as the thickness (a point on the profile line) of the sub spacer 5 monotonically increases and then monotonically decreases in the cross sectional view. Specifically, for example, the shape may be one having a step as shown in FIG. 7(a), a conical shape as shown in FIG. 7(b), or a cylindrical shape as shown in FIG. 7(c). In the case of the shapes shown in FIGS. 7(a) to 7(c), the distal end of each sub spacer 5 is spherically rounded. In addition, the sub spacer 5 may include a flat portion. Specifically, for example, the cross sectional view of the sub spacer 5 may have a trapezoidal shape as shown in FIG. 8(a), a pyramid-like shape with at least one step as shown in FIG. 8(b), or a cylindrical shape with a flat distal end as shown in FIG. 8(c). Further, the shapes shown in FIGS. 2, 7(a) to 7(c), and 8(a) to 8(c) are all bilaterally symmetrical in the cross sectional view; however, the sub spacer 5 may have a bilaterally asymmetrical and unbalanced shape in the cross sectional view as shown in FIGS. 9(a) and 9(b). All of the shapes shown in FIGS. 7 to 9 can suppress the occurrence of a disclination as in the shape shown in FIG. 2.

The distance between the sub spacers 5 is not particularly limited, and it can be suitably adjusted according to the design (such as the size of the pixel and the subpixel) of the liquid crystal display device. It is considered that the deterioration of the display quality will be more significant if the distance between the sub spacers 5 is long because a large disclination is likely to occur, resulting in the presence of a disclination over several pixels between the sub spacers. In contrast, the present embodiment makes it possible to suppress the occurrence of a disclination even in the case where the distance between the sub spacers 5 is long.

The horizontal photo-alignment films 6 and 7 are formed in the following manner: an alignment film material is diluted in a good or poor solvent to obtain a coating solution; the coating solution is applied to a substrate by ink-jet printing or the like to form a coating film having a thickness of about 1000 to 1500 Å; after application of the coating solution, the thus-obtained coating film is dried and baked; and then the coating film is alignment-treated, for example, by emitting polarized ultraviolet light to the coating film. In the above case where the coating solution containing an alignment film material is applied to the color filter substrate on which the sub spacers 5 are formed, usually, the coating solution hardly remains on the sub spacers 5. Thus, the horizontal photo-alignment film 7 is not formed on the sub spacers 5 or is formed in minute amounts on the sub spacers 5. Yet, as shown in FIG. 4, the horizontal photo-alignment film 7 may be formed on the sub spacers 5.

As for the alignment film material, an alignment film material having a photoreactive functional group is used. The photoreactive functional group includes at least one functional group selected from the group consisting of a chalcone group, a coumarin group, a cinnamato group, an azobenzene group, and a stilbene group. An alignment film material including a cyclobutane skeleton in a repeating unit may also be used. As described above, an isomeric, dimeric, re-aligned, or dissociated alignment film material is used. The liquid crystal layer 30 will have a similar pre-tilt angle (for example, 0°) regardless of which of these materials is used, thus achieving an effect of suppressing a disclination to a similar degree.

Figure 15:
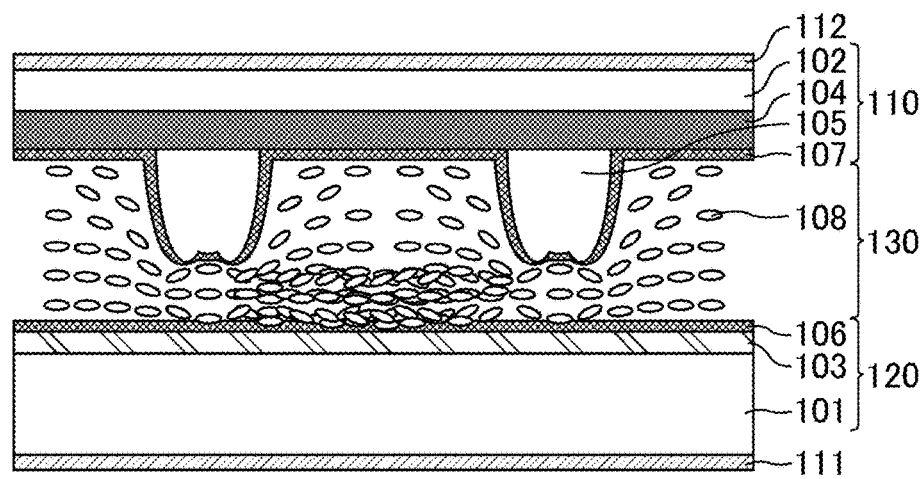
FIG. 15 is a cross-sectional view showing the occurrence of a disclination in the liquid crystal display device according to the comparative embodiment.
Figure 16:
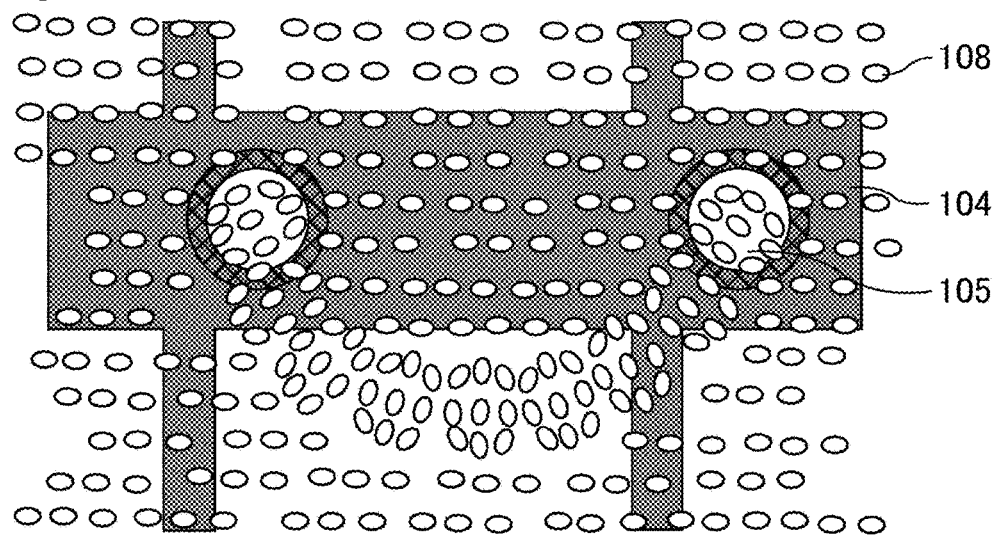
FIG. 16 is a schematic plan view showing the occurrence of a disclination in a traverse direction in the liquid crystal display device according to the comparative embodiment.
Figure 17:
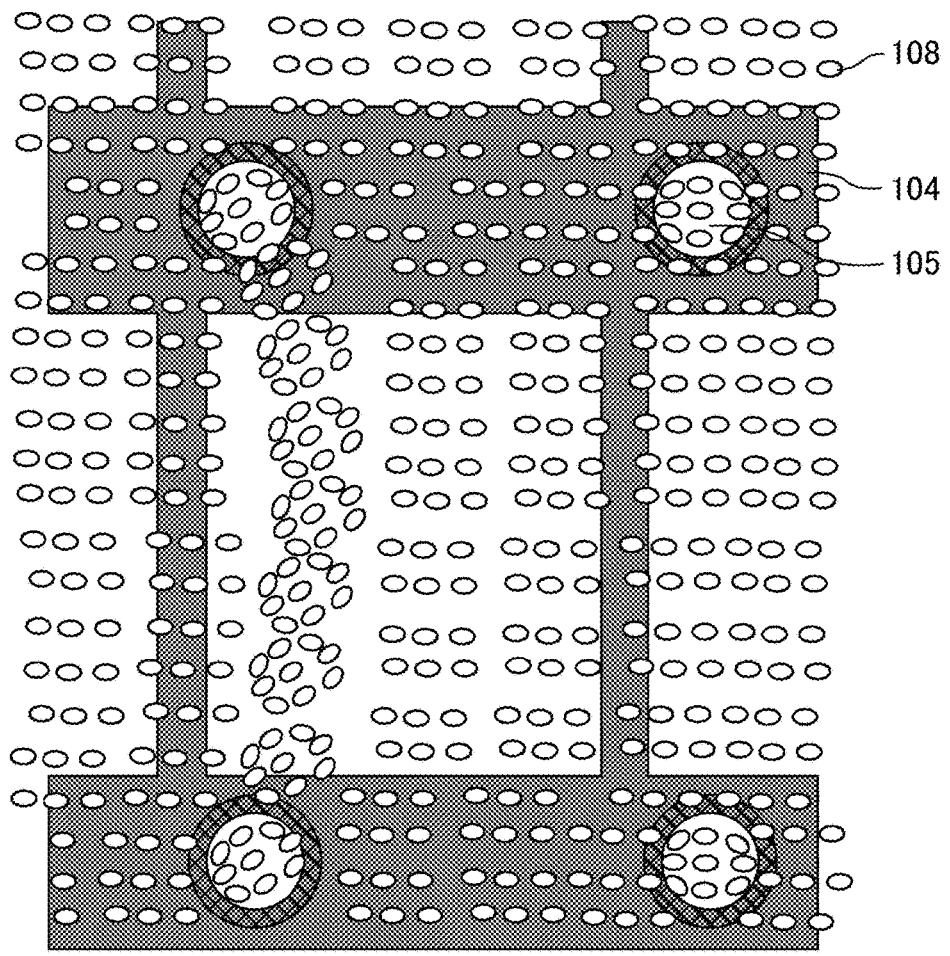
FIG. 17 is a schematic plan view showing the occurrence of a disclination in a longitudinal direction in the liquid crystal display device according to the comparative embodiment.

Although the present inventors examined whether it is possible to suppress a disclination by increasing the alignment regulating force of the alignment film in the liquid crystal display device according to the comparative embodiment as shown in FIGS. 15 to 17, a sufficient effect was not achieved at this point. The reason was confirmed through observation under an electron microscope as follows: the solution (coating solution) containing an alignment film material, which was applied by inkjet printing, hardly remains particularly in the vicinity of the distal end of each sub spacer, and flows toward the circumference of the bottom of the sub spacer; thus, the alignment film is less likely to be formed particularly in the vicinity of the distal end of the sub spacer, failing to achieve a sufficient alignment regulating force. Therefore, improving the shape of the sub spacer is considered to be effective in the suppression of a disclination.

The liquid crystal display device according to Embodiment 1 may further include a polymer layer having an alignment regulating force on at least one of the horizontal photo-alignment films 6 and 7. The polymer layer is preferably formed entirely on the horizontal photo-alignment films 6 and 7, and more preferably in such a manner that it is dense and has a substantially uniform thickness. In addition, the polymer layer may be formed in a dotted manner on the horizontal photo-alignment films 6 and 7, i.e., it may be formed discretely on the surface of the horizontal photo-alignment films 6 and 7. Also in this case, it is possible to uniformly maintain the alignment regulating force of the horizontal photo-alignment films 6 and 7 and suppress image sticking. Further, after the polymer layer is formed on at least a part of the horizontal photo-alignment films 6 and 7, a polymer network structure formed in a network shape may be formed in the entire liquid crystal layer 30.

An example of a specific procedure for forming the polymer layer is described. First, a liquid crystal composition containing a liquid crystal material and at least one type of monomer is injected between the active matrix substrate 20 and the color filter substrate 10. Subsequently, a polarizer is attached to both of the active matrix substrate 20 and the color filter substrate 10 so as to prepare a liquid crystal display panel, and a backlight is disposed on the liquid crystal display panel, on the side opposite to the display surface. Then, the liquid crystal layer 30 is irradiated with a certain amount of visible light emitted from the backlight.

Light used to polymerize a monomer is not particularly limited, and any light such as ultraviolet light or visible light can be suitably selected according to the type of the monomer. In particular, the use of visible light makes it possible to greatly reduce deterioration or damage that occurs in the constituent members such as the liquid crystal layer and the alignment film. The use of visible light also makes it possible to polymerize a monomer even after the polarizer and the backlight are disposed on the liquid crystal display panel. Therefore, unlike the case of using ultraviolet light for irradiation, there is no need for new equipment, and as a result, the use of visible light greatly contributes to the efficiency of the production process and the cost reduction.

A monomer suitably used to form the polymer layer is described below. The monomer used to form the polymer layer can be determined by confirming the molecular structure of the monomer unit in the polymer layer of the present embodiment.

The polymer layer is preferably formed by polymerization of at least one type of monomer having a monofunctional or polyfunctional polymerizable group having a ring structure. Examples of such monomers include a monomer represented by the following chemical formula (1).

[Chem. 1]

$$P^1-S_p^1-R^2-A^1-(Z-A^2)_m-R^1 \qquad (1)$$

In the chemical formula (1), $R^1$ represents a $-R^2$-$Sp^1$-$P^1$ group, a hydrogen atom, a halogen atom, a $-CN$ group, an $-NO_2$ group, an $-NCO$ group, an $-NCS$ group, an $-OCN$ group, an $-SCN$ group, an $-SF_5$ group, or a C1 to C12 linear or branched alkyl group.

$P^1$ represents a polymerizable group. $Sp^1$ represents a C1 to C6 linear, branched, or cyclic alkylene or alkyleneoxy group, or a direct bond.

A hydrogen atom in $R^1$ may be replaced by a fluorine atom or a chlorine atom. A $-CH_2-$ group in $R^1$ may be replaced by an $-O-$ group, an $-S-$ group, an $-NH-$ group, a $-CO-$ group, a $-COO-$ group, an $-OCO-$ group, an $-O-COO-$ group, an $-OCH_2-$ group, a $-CH_2O-$ group, an $-SCH_2-$ group, a $-CH_2S-$ group, an $-N(CH_3)-$ group, an $-N(C_2H_5)-$ group, an $-N(C_3H_7)-$ group, an $-N(C_4H_9)-$ group, a $-CF_2O-$ group, an $-OCF_2-$ group, a $-CF_2S-$ group, an $-SCF_2-$ group, an $-N(CF_3)-$ group, a $-CH_2CH_2-$ group, a $-CF_2CH_2-$ group, a $-CH_2CF_2-$ group, a $-CF_2CF_2-$ group, a $-CH=CH-$ group, a $-CF=CF-$ group, a $-C\equiv C-$ group, a $-CH=CH-COO-$ group, or an $-OCO-CH=CH-$ group, as long as an oxygen atom and a sulfur atom are not adjacent to each other.

$R^2$ represents an $-O-$ group, an $-S-$ group, an $-NH-$ group, a $-CO-$ group, a $-COO-$ group, an $-COO-$ group, an $-O-COO-$ group, an $-OCH_2-$ group, a $-CH_2O-$ group, an $-SCH_2-$ group, a $-CH_2S-$ group, an $-N(CH_3)-$ group, an $-N(C_2H_5)-$ group, an $-N(C_3H_7)-$ group, an $-N(C_4H_9)-$ group, a $-CF_2O-$ group, an $-OCF_2-$ group, a $-CF_2S-$ group, an $-SCF_2-$ group, an $-N(CF_2)-$ group, a $-CH_2CH_2-$ group, a $-CF_2=CH_2-$ group, a $-CH_2CF_2-$ group, a $-CF_2CF_2-$ group, a $-CH=CH-$ group, a $-CF=CF-$ group, a $-C\equiv C-$ group, a $-CH=CH-COO-$ group, an $-OCO-CH=CH-$ group, or a direct bond.

$A^1$ and $A^2$ are the same or different, and each represents a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo

[2.2.2]octylene group, a piperidine-1,4-diyl group, a naphthalene-2,6-diyl group, a decahydronaphthalene-2,6-diyl group, a 1,2,3,4-tetrahydronaphthalene-2,6-diyl group, an indane-1,3-diyl group, an indane-1,5-diyl group, an indane-2,5-diyl group, a phenanthrene-1,6-diyl group, a phenanthrene-1,8-diyl group, a phenanthrene-2,7-diyl group, a phenanthrene-3,6-diyl group, an anthracene-1,5-diyl group, an anthracene-1,8-diyl group, an anthracene-2,6-diyl group, or an anthracene-2,7-diyl group. —$CH_2$— groups in $A^1$ and $A^2$ each may be replaced by an —O— group or an —S— group, as long as they are not adjacent to each other. Hydrogen atoms in $A^1$ and $A^2$ each may be replaced by a fluorine atom, a chlorine atom, a —CN group, or a C1 to C6 alkyl, alkoxy, alkyl carbonyl, alkoxy carbonyl, or alkyl carbonyloxy group.

Each Z is the same or different and represents an —O— group, an —S— group, an —NH— group, a —CO— group, a —COO— group, an —OCO— group, an —O—COO— group, an —$OCH_2$— group, a —$CH_2O$— group, an —$SCH_2$— group, a —$CH_2S$— group, an —$N(CH_3)$— group, an —$N(C_2H_5)$— group, an —$N(C_3H_7)$— group, an —$N(C_4H_9)$— group, a —$CF_2O$— group, an —$OCF_2$— group, a —$CF_2S$— group, an —$SCF_2$— group, an —$N(CF_3)$— group, a —$CH_2CH_2$— group, a —$CF_2CH_2$— group, a —$CH_2CF_2$— group, a —$CF_2CF_2$— group, a —CH═CH— group, a —CF═CF— group, a —C≡C— group, a —CH═CH—COO group, an —OCO—CH═CH— group, or a direct bond; and m is 0, 1, or 2.

More specific examples thereof include monomers represented by the following chemical formulae (2-1) to (2-5):

[Chem. 2]

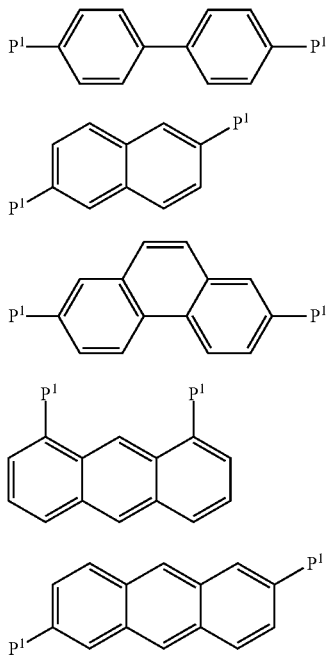

(2-1)

(2-2)

(2-3)

(2-4)

(2-5)

In these chemical formulae (2-1) to (2-5), each $P^1$ is the same or different and represents a polymerizable group.

Examples of $P^1$ above include an acryloyloxy group, a methacryloyloxy group, a vinyl group, a vinyloxy group, an acryloylamino group, and a methacryloylamino group. Herein, hydrogen atoms in benzene rings and fused rings in the compounds represented by the above chemical formulae (2-1) to (2-5) may be partially or fully replaced by halogen atoms, or C1 to C12 alkyl or alkoxy groups. In addition, hydrogen atoms in alkyl and alkoxy groups may be partially or fully replaced by halogen atoms. Further, the bonding position of $P^1$ to the benzene rings and the fused rings is not limited to the ones shown.

The monomer represented by the chemical formula (1) is a monomer polymerizable by ultraviolet irradiation. The polymer layer of the present embodiment may be a polymerized product of a monomer polymerizable by visible light irradiation.

Monomers to form the polymer layer include two or more types of monomers. The monomer polymerizable by visible light irradiation may be a monomer that polymerizes another monomer. The monomer that polymerizes another monomer refers to, for example, a monomer that undergoes a chemical reaction by visible light irradiation; initiates and promotes polymerization of another monomer that does not polymerize by itself by visible light irradiation; and polymerizes itself, while the wavelength range that induces reaction is different depending on the molecular structure. Owing to the monomer that polymerizes another monomer, a large number of existing monomers that do not polymerize by light irradiation (for example, visible light irradiation) can be used as materials of the polymer layer. Examples of the monomer that polymerizes another monomer include a monomer having a structure that generates radicals by visible light irradiation.

Examples of the monomer that polymerizes another monomer include a monomer represented by the following chemical formula (3).

[Chem. 3]

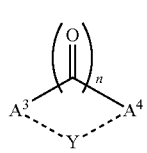

(3)

In the chemical formula (3), $A^3$ and $A^4$ are the same or different, and each represents a benzene ring, a biphenyl ring, or a C1 to C12 linear or branched alkyl or alkenyl group. At least one of $A^3$ and $A^4$ includes an -$Sp^2$-$P^2$ group. A hydrogen atom in $A^3$ and $A^4$ each may be replaced by an -$Sp^2$-$P^2$ group, a halogen atom, a —CN group, an —$NO_2$ group, an —NCO group, an —NCS group, an —OCN group, an —SCN group, an —$SF_5$ group, or a C1 to C12 linear or branched alkyl, alkenyl, or aralkyl group. Two adjacent hydrogen atoms in $A^3$ and $A^4$ each may be replaced by a C1 to C12 linear or branched alkylene or alkenylene group to form a cyclic structure. A hydrogen atom in an alkyl, alkenyl, alkylene, alkenylene, or aralkyl group in $A^3$ and $A^4$ each may be replaced by an -$Sp^2$-$P^2$ group. A —$CH_2$— group in an alkyl, alkenyl, alkylene, alkenylene, or aralkyl group in $A^3$ and $A^4$ each may be replaced by an —O— group, an —S— group, an —NH— group, a —CO— group, a —COO— group, an —OCO— group, an —O—COO— group, an —$OCH_2$— group, a —$CH_2O$— group, an —$SCH_2$— group, a —$CH_2S$— group, an —$N(CH_3)$— group, an —$N(C_2H_5)$— group, an —$N(C_3H_7)$— group, an —$N(C_4H_9)$— group, a —$CF_2O$— group, an —$OCF_2$— group, a —$CF_2S$— group, an —$SCF_2$— group, an —$N(CF_3)$— group, a —$CH_2CH_2$— group, a —$CF_2CH_2$— group, a —CH$_2$CF$_2$— group, a —CF$_2$CF$_2$— group, a —CH=CH— group, a —CF=CF— group, a —C≡C— group, a —CH=CH—COO— group, or an —OCO—CH=CH— group, as long as an oxygen atom, a sulfur atom, and a nitrogen atom are not adjacent to one another.

P$^2$ represents a polymerizable group. Sp$^2$ represents a C1 to C6 linear, branched, or cyclic alkylene or alkyleneoxy group, or a direct bond.

Further, n is 1 or 2. A dotted line connecting A$^3$ with Y and a dotted line connecting A$^4$ with Y indicate that a Y-mediated bond may be present between A$^3$ and A$^4$.

Y represents a —CH$_2$— group, a —CH$_2$CH$_2$— group, a —CH=CH— group, an —O— group, an —S— group, an —NH— group, an —N(CH$_2$)— group, an —N(C$_2$H$_5$)— group, an —N(C$_3$H$_7$)— group, an —N(C$_4$H$_9$)— group, an —OCH$_2$— group, a —CH$_2$O— group, an —SCH$_2$— group, or a —CH$_2$S— group, or a direct bond.

More specific examples thereof include monomers represented by the following chemical formulae (4-1) to (4-8).

[Chem. 4]

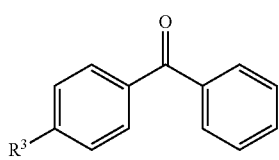
(4-1)

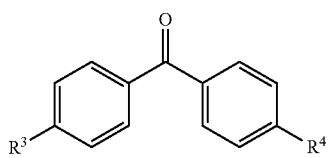
(4-2)

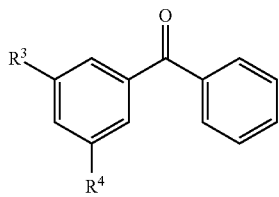
(4-3)

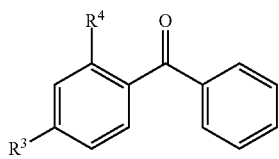
(4-4)

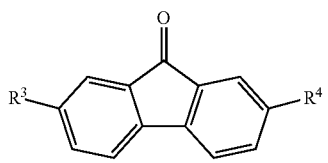
(4-5)

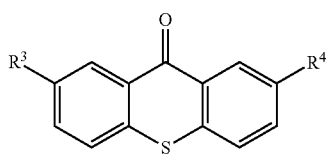
(4-6)

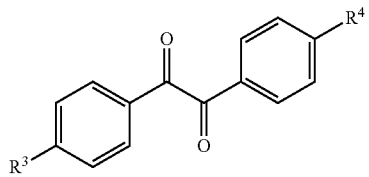
(4-7)

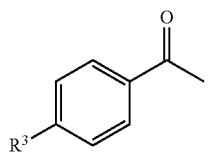
(4-8)

In the chemical formulae (4-1) to (4-8), R$^3$ and R$^4$ are the same or different, and each represents an -Sp$^2$-P$^2$ group, a hydrogen atom, a halogen atom, a —CN group, an —NO$_2$ group, an —NCO group, an —NCS group, an —OCN group, an —SCN group, an —SF$_5$ group, or a C1 to C12 linear or branched alkyl, aralkyl, or phenyl group. At least one of R$^3$ and R$^4$ includes an -Sp$^2$-P$^2$ group.

P$^2$ represents a polymerizable group. Sp$^2$ represents a C1 to C6 linear, branched, or cyclic alkylene or alkyleneoxy group, or a direct bond. When at least one of R$^3$ and R$^4$ represents a C1 to C12 linear or branched alkyl, aralkyl, or phenyl group, a hydrogen atom in at least one of R$^3$ and R$^4$ above may be replaced by a fluorine atom, a chlorine atom, or an -Sp$^2$-P$^2$ group. A —CH$_2$— group in R$^3$ and R$^4$ each may be replaced by an —O— group, an —S— group, an —NH— group, a —CO— group, a —COO— group, an —OCO— group, an —O—COO— group, an —OCH$_2$— group, a —CH$_2$O— group, an —SCH$_2$— group, a —CH$_2$S— group, an —N(CH$_3$)— group, an —N(C$_2$H$_5$)— group, an —N(C$_3$H$_7$)— group, an —N(C$_4$H$_9$)— group, a —CF$_2$O— group, an —OCF$_2$— group, a —CF$_2$S— group, an —SCF$_2$— group, an —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, or an —OCO—CH=CH— group, as long as an oxygen atom, a sulfur atom, and a nitrogen atom are not adjacent to one another.

Examples of P$^2$ above include an acryloyloxy group, a methacryloyloxy group, a vinyl group, a vinyloxy group, an acryloylamino group, and a methacryloylamino group. Herein, hydrogen atoms in benzene rings in the compounds represented by the above chemical formulae (4-1) to (4-8) may be partially or fully replaced by halogen atoms or C1 to C12 alkyl or alkoxy groups. In addition, hydrogen atoms in alkyl and alkoxy groups may be partially or fully replaced by halogen atoms. Further, the bonding positions of R$^3$ and R$^4$ to the benzene rings are not limited to the ones shown.

The monomers to form the polymer layer (for example, the compounds represented by the chemical formulae (2-1) to (2-5), and the compounds represented by the above chemical formulae (4-1) to (4-8)) preferably include two or more polymerizable groups. For example, monomers including two polymerizable groups are preferred.

The above-described monomers may be added to liquid crystal without using a conventional polymerization initiator. This results in a significant improvement in electrical properties because there is no residual polymerization initiator that can be an impurity in the liquid crystal layer. In other words, a polymerization initiator for the monomers can be substantially absent in the liquid crystal layer during polymerization of the monomers.

In the present embodiment, for example, a biphenyl-based bifunctional methacrylate monomer represented by the following chemical formula (5) may be used.

[Chem. 5]

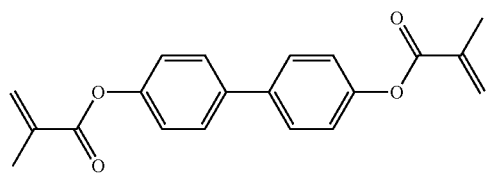
(5)

In this case, the formation of a polymer can be ensured without mixing a photopolymerization initiator. The radical generation process represented by the following formulae (6-1) and (6-2) is considered to be induced by light irradiation.

[Chem. 6]

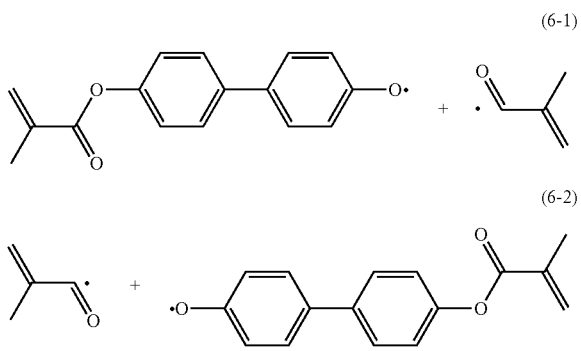
(6-1)

(6-2)

In addition, the presence of a methacrylate group also allows the monomer to form a polymer by radical polymerization. Monomers that dissolve in liquid crystal are preferably used, and rod-like molecules are preferred. Examples thereof may include naphthalene-based, phenanthrene-based, and anthracene-based monomers, in addition to the biphenyl-based monomer. In addition, hydrogen atoms therein may be partially or fully replaced by halogen atoms, alkyl groups, or alkoxy groups (hydrogen atoms in these groups may be partially or fully replaced by halogen atoms). Examples of polymerizable groups may also include an acryloyloxy group, a vinyloxy group, an acryloylamino group, and a methacryloylamino group, in addition to the methacryloyloxy group. These monomers can generate radicals by light having a wavelength ranging from about 300 to 380 nm. In addition to the above monomers, monomers such as acrylates and diacrylates having no photopolymerization initiating function may be mixed. The photopolymerization reaction rate can be adjusted with these monomers.

In addition, in the present embodiment, a mixture of a monomer represented by the following chemical formula (7-1) and a monomer represented by the following chemical formula (7-2) can also be used.

[Chem. 7]

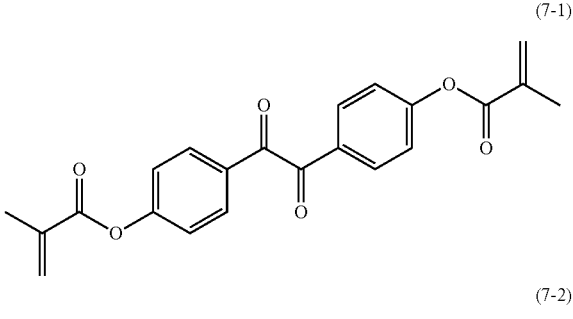
(7-1)

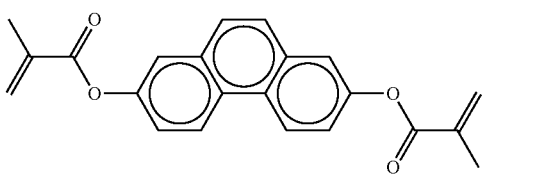
(7-2)

In this case, visible light may be used to irradiate the monomers to induce polymerization, thus reducing damage to the liquid crystal and the photo-alignment films. Other examples of monomers that can be used include benzoin ether-based, acetophenone-based, benzil ketal-based, and ketone-based monomers, which generate radicals by photofragmentation and hydrogen abstraction. A polymerizable group must be attached to these monomers. Examples of the polymerizable group include an acryloyloxy group, a vinyloxy group, an acryloylamino group, and a methacryloylamino group, in addition to the methacryloyloxy group. In addition, in the present embodiment, a polyimide having a cyclobutane skeleton may be used as the main chain of a polymer of an alignment film material.

In addition, a preferred structure in the polymer layer is described in detail. The polymer layer preferably includes a structure represented by the following chemical formula (8) in the repeating unit.

[Chem. 8]

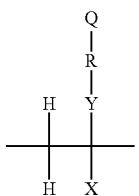
(8)

In the chemical formula (8), X represents —H or —CH$_3$; Y represents —O—, —COO—, —CONH—, or a direct bond; R represents a divalent group having a benzene ring structure that is bonded to at least Y; and Q represents a monovalent organic group.

In the present invention, preferably used as the monomer to form the repeating unit is a monomer that itself acts as an initiator and undergoes polymerization by light irradiation. Herein, such a monomer is also referred to as an initiator function-imparted monomer. The monomer preferably has a structure in which an acryloyloxy group, a methacryloyloxy group, a vinyl group, a vinyloxy group, an acryloylamino group, or a methacryloylamino group is bonded to a benzene ring. If the monomer has a structure that forms a repeating unit represented by the above chemical formula (8) (preferably, a structure that includes the benzene ring), radicals can be generated by light irradiation, as shown by the following chemical reaction formula (9), for example. This reaction is considered to be the same as the reaction in which the functional group is cleaved to generate radicals during photo-Fries rearrangement. Further, as shown by the following chemical reaction formula (9), for example, the presence of a methacrylate group allows a radical polymerization reaction to form a polymer. In general, a monomer that is polymerized by light irradiation is referred to as a photopolymerizable monomer. In the case of an initiator function-imparted monomer, the photopolymerizable monomer itself generates radicals and undergoes polymerization, and thus it does not require an initiator. It should be noted that although an initiator may be used to form the polymer layer, the initiator is preferably used in a minimum amount because the residual initiator will affect the performance of the liquid crystal display. It is most preferred not to use an initiator.

[Chem. 9]

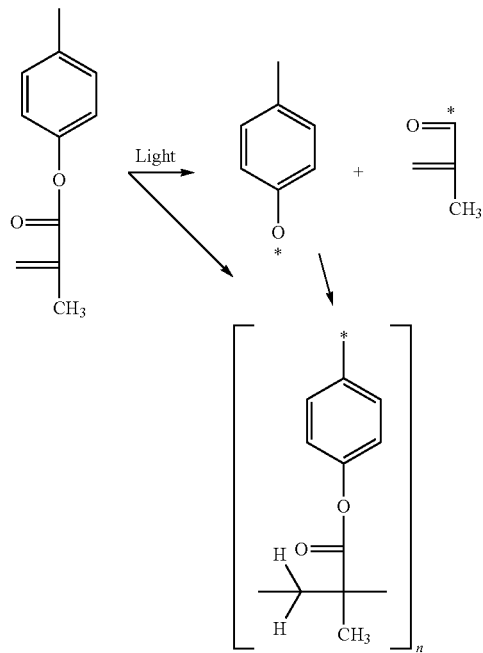

(9)

In the above chemical reaction formula (9), the symbol "*" represents any organic group. The same applies hereinafter.

The above chemical reaction formula (9) shows a mode in which an initiator function-imparted monomer is cleaved by light to generate radicals, and a mode in which a double bond in the monomer is polymerized to form a repeating unit of a polymer.

The initiator function-imparted monomer refers to a monomer that generates radicals and induces a polymerization reaction, even in the absence of a commonly used initiator, by light irradiation using visible light or ultraviolet light whose intensity is comparable to that of ultraviolet light used to irradiate a monomer to induce a polymerization reaction in the usual PSA technique.

Preferably, R in the above chemical formula (8) includes a structure selected from the following chemical formula group (10). If a rod-like skeleton similar to a rod-like liquid crystal molecule and having high affinity with the liquid crystal molecule is included in the repeating unit, it can improve the solubility of the monomer in the liquid crystal and can also enhance the alignment regulating force of the horizontal photo-alignment films.

[Chem. 10]

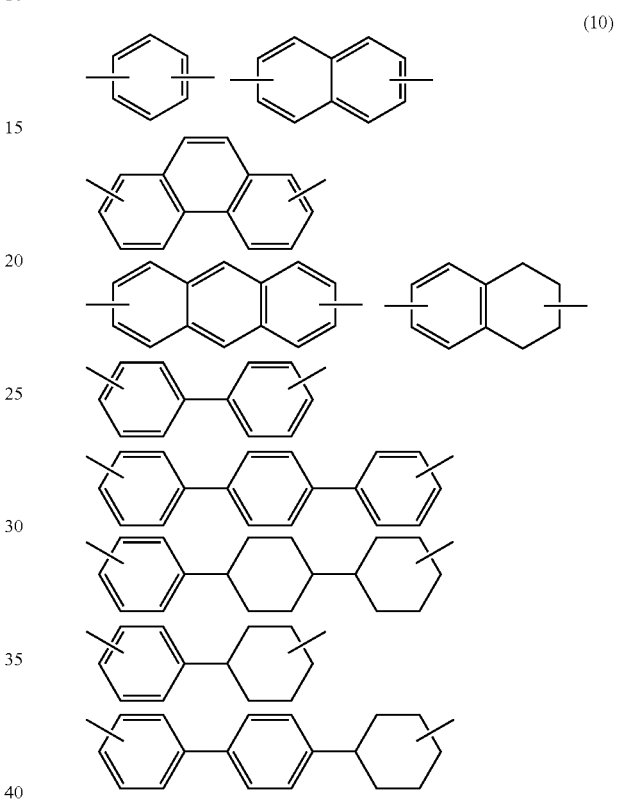

(10)

In the chemical formula group (10), hydrogen atoms may be partially or fully replaced by halogen atoms. In addition, each ring structure may be a hetero ring in which a carbon atom is replaced by another atom.

The polymer layer preferably includes a structure represented by the following chemical formula (11) or (12) in the repeating unit.

[Chem. 11]

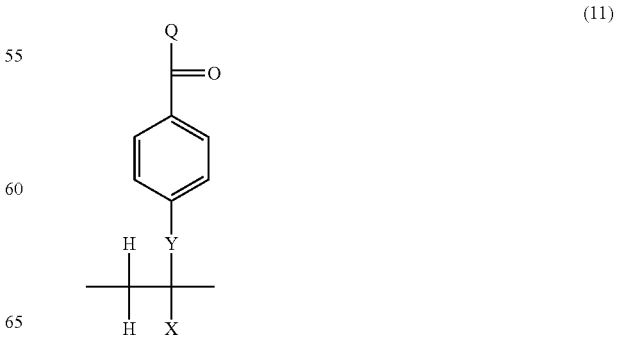

(11)

-continued

[Chem. 12]

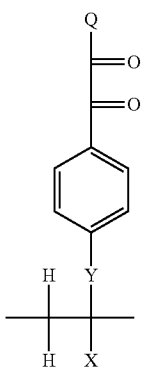

(12)

In the chemical formulae (11) and (12), X represents —H or —CH$_3$; Y represents —O—, —COO—, —CONH—, or a direct bond; and Q represents a monovalent organic group.

In other words, it is preferred that the polymer layer includes a benzoyl skeleton. As shown by the following chemical reaction formula (13), a monomer having a benzoyl skeleton generates radicals by a hydrogen-atom abstraction reaction. Thus, such a monomer is more likely to generate radicals than a monomer having a non-benzoyl skeleton. Therefore, it is possible to reduce the polymerization time required for forming the polymer layer, and also to form a dense polymer layer.

[Chem. 13]

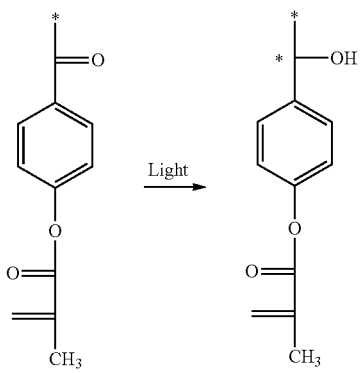

(13)

Preferably, Q in the above chemical formula (8) includes a benzene ring structure that is bonded to the R moiety. This allows the rod-like skeleton in the repeating unit to become more similar to the rod-like skeleton of the liquid crystal molecule, resulting in an improved affinity between the monomer skeleton and the liquid crystal molecule as well as an enhanced ability of the thus-formed polymer layer to stabilize the liquid crystal alignment. In addition, the liquid crystal is usually sealed within a panel in vacuum; however, if the monomer has a low molecular weight, the concentration of the monomer may unfortunately be reduced or become uneven due to volatilization of the monomer. The introduction of a benzene ring can increase the molecular weight and also reduce the volatility.

Preferably, Q includes a polymer chain. This allows the polymer layer to have a dense three-dimensional structure, thus improving the ability of the polymer layer to stabilize the liquid crystal alignment.

The polymer layer is preferably formed from a bifunctional monomer, and more preferably includes at least one structure selected from the following chemical formula group (14) in the repeating unit. This results in a further increase in the density of polymerization starting points in the liquid crystal display panel. In addition, in the case where cleavage as shown by the above chemical reaction formula (9) is induced to generate radicals, if the monomer is a bifunctional monomer, each of the cleaved moieties will include a polymerization reaction group. Thus, it is possible to suppress the unreacted materials from remaining in the liquid crystal.

[Chem. 14]

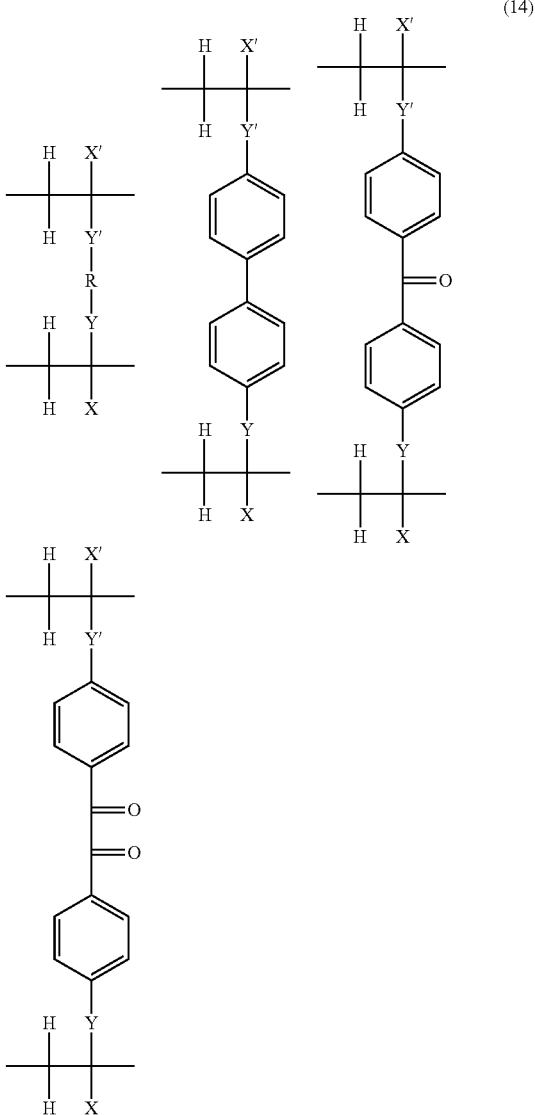

(14)

In the chemical formula group (14), X and X' each independently represent —H or —CH$_3$; and Y and Y' each independently represents —O—, —COO—, —CONH—, or a direct bond.

The average molecular weight of the polymer constituting the polymer layer is not particularly limited, and may be comparable to the number average molecular weight or weight average molecular weight of the polymer formed by the usual PSA technique. Typically, the average molecular weight is desirably 8 or more in terms of the number of repeating units, or 1000 or more in terms of the molecular weight.

In addition to the monomers exemplified above and the polymers including the structures exemplified above, other monomers and polymers that are used in the usual PSA technique can be suitably used in the present invention.

Example 1

A liquid crystal cell (liquid crystal display panel) according to Embodiment 1 was actually produced in Example 1.

First, a 10-inch IGZO-TFT substrate having an FFS structure and a color filter substrate as a counter substrate were provided. Herein, the IGZO-TFT substrate refers to an active matrix substrate in which an indium gallium zinc complex oxide is used as a semiconductor. In addition, a slit electrode on the upper layer was formed to have an electrode width L of 3 µm and to have an inter-electrode distance (slit width) S of 5 µm (L/S=3 µm/5 µm).

As a material of main spacers and sub spacers, a negative photoresist was applied to the color filter substrate, and a mask was arranged. Subsequently, the color filter substrate was irradiated with light having a wavelength of 365 nm and an intensity of 150 mJ/cm$^2$. A halftone mask having a transmittance of 15% was used to form the sub spacers. The proximity gap between the mask and the color filter substrate was set to 240 µm. Each sub spacer in Example 1 had the same shape as the sub spacer 5 shown in FIG. 2. The sub spacer was formed to have a bottom diameter of 12 µm and a height of 2.5 µm. The height of the main spacer was set such that the thickness of the liquid crystal layer in the active area was 3.3 µm, and the bottom diameter of the main spacer was set to 14 µm. As shown in FIG. 1, the sub spacers were arranged on almost all subpixels, and the main spacers were arranged on the subpixels on which the sub spacers were not arranged. The distance between the nearest adjacent sub spacers was set to 30 µm.

A coating solution containing a photoreactive alignment film material having a photoreactive functional group at the side chain was applied to these substrates by ink-jet printing to form a coating film. After the coating solution was applied, the thus-obtained coating film was temporarily dried at 80° C. for 3 minutes, and then baked at 200° C. for 40 minutes while purging with nitrogen gas. The alignment film on a transparent electrode, which is the uppermost layer (i.e., the layer closest to the liquid crystal layer) on the active matrix substrate, had a film thickness of 45 nm in the active area. The alignment film on the color filter substrate had a film thickness of 50 nm in the active area.

Next, these substrates were irradiated with linearly polarized ultraviolet light having a wavelength of 313 nm and an intensity of 5 J/cm$^2$ from the normal direction of the substrates for liquid crystal alignment treatment (photo-alignment treatment), whereby a horizontal photo-alignment film was formed. The horizontal photo-alignment film was aligned in a monodomain. In other words, the liquid crystal alignment treatment was performed in a maskless manner, and the domain was not divided.

Next, a thermosetting seal (HC1413FP, manufactured by Mitsui Chemicals, Inc.) was printed on the active matrix substrate by using a screen plate. These two types of substrates were bonded to each other such that the polarization direction of irradiated ultraviolet light is consistent between the substrates. Next, the bonded substrates were heated at 200° C. for 60 minutes in a nitrogen-purged furnace while applying a pressure of 0.5 kgf/cm$^2$ thereto, and the seal was thus cured.

A liquid crystal material containing liquid crystal molecules having positive anisotropy of dielectric constant was injected under vacuum into a cell prepared by the above method. An inlet of a cell through which the liquid crystal material was injected was sealed with an epoxy adhesive (ARALDITE AR-S30, manufactured by NICHIBAN Co., Ltd.). At this point, a short circuit was created between the electrodes and electrostatic charge was removed from the glass surface so that the liquid crystal alignment would not be disturbed by an external electric field. Next, in order to remove the liquid crystal flow alignment and simulate the curing of the seal in the one drop fill (ODF) process during mass production, the panel was heated at 130° C. for 40 minutes to transform the liquid crystal into the isotropic phase for realignment treatment, whereby obtaining a liquid crystal cell of the FFS mode in which the liquid crystal molecules were uniaxially aligned in a direction perpendicular to the polarization direction of ultraviolet light used to irradiate the alignment film. All the processes were performed under yellow fluorescent light to prevent the liquid crystal panel from being exposed to ultraviolet light emitted from a fluorescent lamp.

Comparative Example 1

In Comparative Example 1, a liquid crystal cell was produced in the same manner as in Example 1, except that the proximity gap was reduced and the intensity of light to irradiate the mask was also reduced to form the sub spacers. Specifically, the proximity gap was set to 100 µm, and the intensity of light having a wavelength of 365 nm in Comparative Example 1 was set to 100% whereas the intensity of light having a wavelength of 365 nm in Example 1 was set to 110%. The shape of the sub spacer in Comparative Example 1 was the same as that of the sub spacer 105 of the comparative embodiment shown in FIG. 2.

The incidence of disclinations was calculated for each of the liquid crystal cells according to Example 1 and Comparative Example 1. The calculation of the incidence of disclinations is the same as the measurement of the so-called yield of the liquid crystal display device. Specifically, a voltage of a threshold or higher was applied to the liquid crystal cell placed between crossed-Nicols polarizers, and the presence of a disclination was visually determined under dark room conditions. The liquid crystal cell in which one or more disclinations were recognized in the display area was evaluated as non-conforming. When 5 out of 100 liquid crystal cells were evaluated as non-conforming, the incidence of disclinations was calculated to be 5%.

Table 1 shows the results. The incidence of disclinations was very high (58.9%) in the liquid crystal cell according to Comparative Example 1, whereas the incidence of disclinations decreased sharply (3.4%) in the liquid crystal cell according to Example 1.

TABLE 1

| | Incidence of disclinations |
|---|---|
| Comparative Example 1 | 58.9% |
| Example 1 | 3.4% |

Modified Example 1

Figure 10:
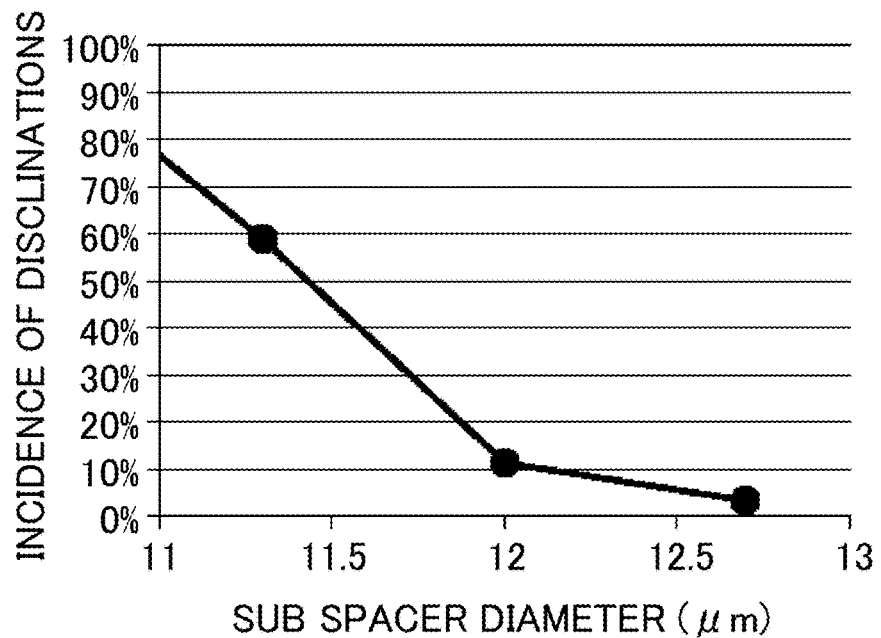
FIG. 10 is a graph showing a relationship between the bottom diameter of the sub spacer and the incidence of disclinations.

A liquid crystal cell was produced in the same manner as in Example 1, except that the bottom diameter of the sub spacer was set to 11.3 µm, 12 µm, and 12.7 µm independently, and the bottom diameter of every main spacer was set to 15 µm. The incidence of disclinations was measured for each case. FIG. 10 shows the results. FIG. 10 is a graph showing a relationship between the bottom diameter of the sub spacer and the incidence of disclinations.

As shown in FIG. 10, the incidence of disclinations was suppressed to a low level when the bottom diameter of the sub spacer was 12 µm and 12.7 µm. In contrast, the incidence of disclinations increased when the bottom diameter of the sub spacer was 11.3 µm. The reason is considered as follows: if the bottom diameter of the sub spacer is too small relative to the bottom diameter of the main spacer, a portion corresponding to the sub spacer will be exposed to less light while the photoresist is irradiated with light; and as a result, the sub spacer will shrink during post-baking, forming a depressed portion at the distal end of the sub spacer.

As described above, it became clear from Modified Example 1 that when the bottom diameter of the main spacer is 15 µm, the bottom diameter of the sub spacer is preferably 12 µm or more, and the difference in the bottom diameter between the main spacer and the sub spacer is preferably 3 µm or less. In addition, it became clear from Modified Example 1 that the bottom diameter of the sub spacer is preferably 80% or more of the bottom diameter of the main spacer.

Embodiment 2

None of the sub spacers 5 included in the liquid crystal display device according to Embodiment 1 had a depressed portion. In contrast, each of the sub spacers 5 included in a liquid crystal display device according to Embodiment 2 had a depressed portion. Except for the above difference, the liquid crystal display device according to Embodiment 2 is the same as the liquid crystal display device according to Embodiment 1, and thus the description thereof is omitted. In addition, various embodiments described in Embodiment 1 are also suitably applicable to Embodiment 2.

Figure 11:
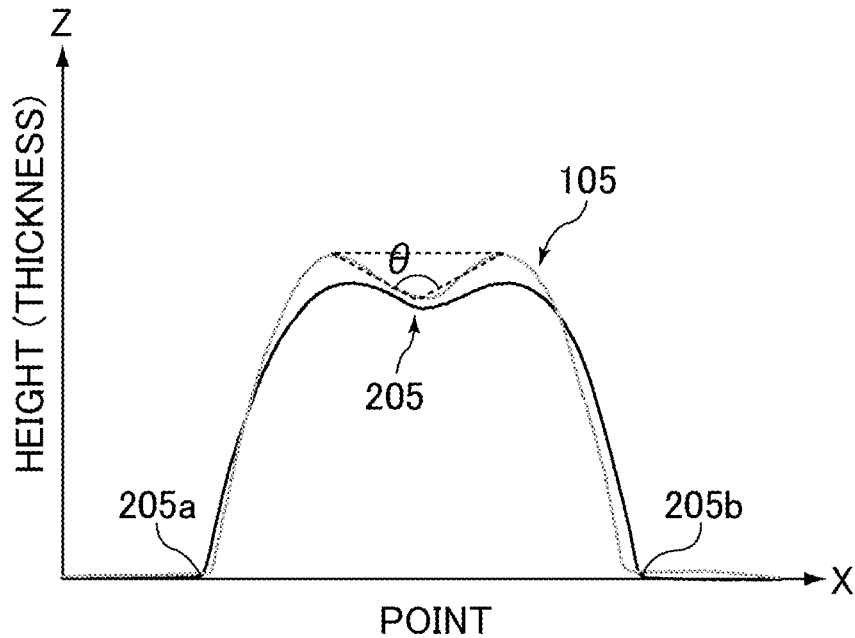
FIG. 11 is a schematic cross-sectional view showing a sub spacer included in a liquid crystal display device according to Embodiment 2, and the sub spacer included in the liquid crystal display device according to the comparative embodiment.

FIG. 11 is a schematic cross-sectional view showing the sub spacer included in the liquid crystal display device according to Embodiment 2, and the sub spacer included in the liquid crystal display device according to the comparative embodiment. As shown in FIG. 11, a sub spacer 205 included in the liquid crystal display device according to Embodiment 2 is configured in the same manner as in the sub spacer 105 included in the liquid crystal display device according to the comparative embodiment such that the thickness (height of a point on the profile line) of the sub spacer 205 in the cross sectional view monotonically increases up to a first point, monotonically decreases from the first point to a second point, monotonically increases from the second point to a third point, and then monotonically decreases from the third point, in a range from an end 205a to another end 205b. In other words, each of the sub spacers 105 and 205 is formed in the shape having a depressed portion at the distal end. More specifically, the cross sectional view refers to a cross section of each of the sub spacers 105 and 205 (usually, a cross section cutting through the center portion of the sub spacers 105 and 205), as in the case of Embodiment 1. In this case, the cross section perpendicular to the color filter substrate (substrate main surface) was observed.

Meanwhile, the depth of the depressed portion of the sub spacer 205 is shallower than that of the sub spacer 105. Specifically, the sub spacer 205 is formed such that the angle θ formed between a line segment connecting the first point and the second point and a line segment connecting the second point and the third point is 168° or more (preferably, 177° or more) and less than 180°.

As described above, the sub spacer 205 is formed such that the depth of the depressed portion is shallow, so that an alignment disturbance, which becomes a core of a disclination, does not easily occur at the depressed portion, and the occurrence of a disclination is thus suppressed.

Figure 12:
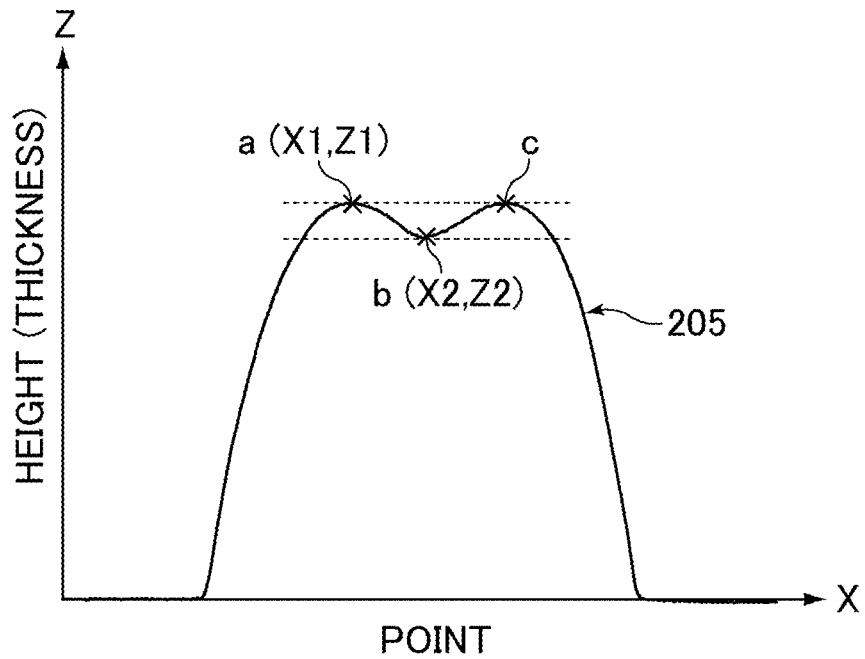
FIG. 12 is another schematic cross-sectional view of the sub spacer included in the liquid crystal display device according to Embodiment 2.

FIG. 12 is another schematic cross-sectional view of the sub spacer included in the liquid crystal display device according to Embodiment 2. As shown in FIG. 12, provided that a first point "a" has coordinates (X1, Z1) and a second point "b" has coordinates (X2, Z2), when the profile line has a shape that is bilaterally symmetrical about a line extending in the thickness direction of the sub spacer and passing through the second point, the angle θ formed between a line segment connecting the first point "a" and the second point "b" and a line segment connecting the second point "b" and the third point "c" can be calculated from the following formula.

$$\mathrm{Tan}(\theta/2) = (X2-X1)/(Z2-Z1)$$

Example 2

A liquid crystal cell according to Embodiment 2 was produced in Example 2.

A liquid crystal cell of Example 2 was produced in the same manner as in the liquid crystal cell of Example 1, except that the proximity gap was reduced and the intensity of light to irradiate the mask was also reduced to form the sub spacers. Specifically, the proximity gap was set to 100 µm, and the intensity of light having a wavelength of 365 nm in Example 2 was set to 91% whereas the intensity of light having a wavelength of 365 nm in Example 1 was set to 110%. The shape of the sub spacer in Example 2 was the same as that of the sub spacer 205 shown in FIG. 11.

The incidence of disclinations was calculated for each of the liquid crystal cells according to Example 2 and Comparative Example 1. The shape of the sub spacer in Comparative Example 1 was the same as that of the sub spacer 105 of the comparative embodiment shown in FIG. 11, and the angle θ=164°. Table 2 shows the results. The incidence of disclinations was very high (58.9%) in the liquid crystal cell according to Comparative Example 1, whereas the incidence of disclinations was suppressed to a low level (11.4%) in the liquid crystal cell according to Example 2.

TABLE 2

|  | Incidence of disclinations | θ (deg) |
| --- | --- | --- |
| Comparative Example 1 | 58.9% | 164 |
| Example 2 | 11.4% | 168 |

Modified Example 2

Figure 13:
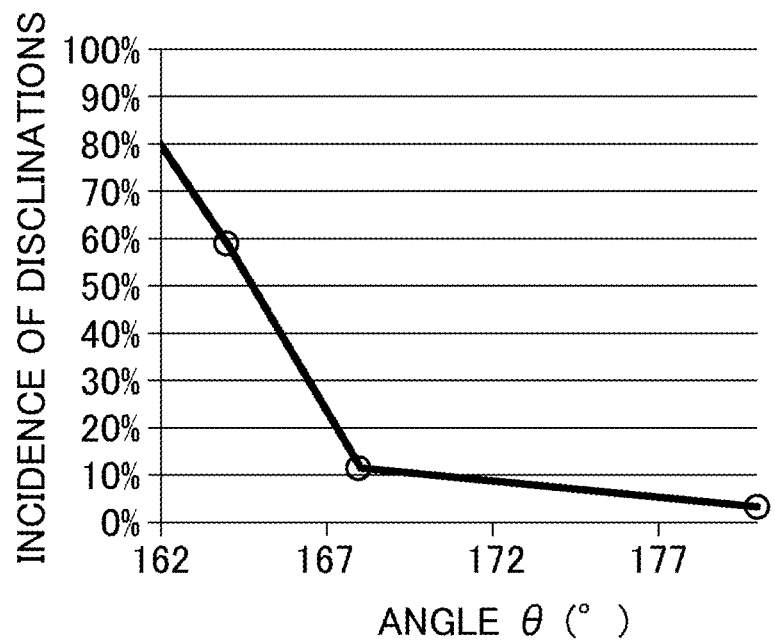
FIG. 13 is a graph showing a relationship between the angle θ and the incidence of disclinations.
Figure 14:
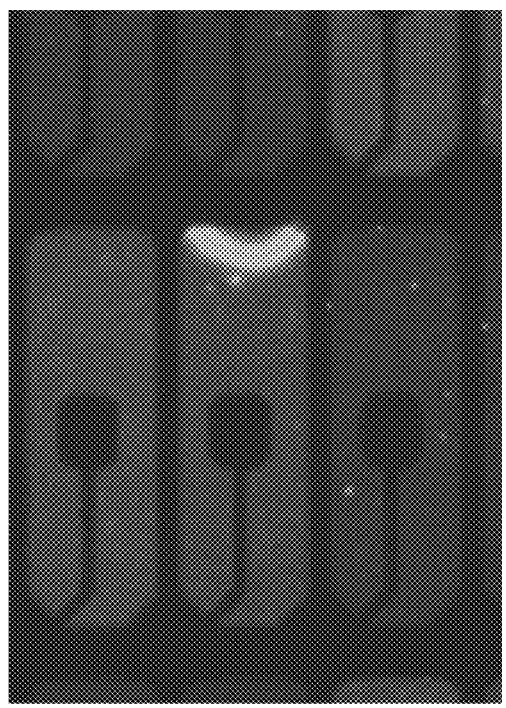
FIG. 14 is an image of a liquid crystal display device in which a disclination is present.

A liquid crystal cell was produced in the same manner as in Example 2, except that the angle θ was set to 180°, and the incidence of disclinations was measured. FIG. 13 shows the results. FIG. 13 is a graph showing a relationship between the angle θ and the incidence of disclinations.

As shown in FIG. 13, it became clear that the incidence of disclinations was suppressed to a low level with the angle θ of 168° as a threshold.

The aforementioned embodiments may be employed in appropriate combination as long as the combination is not beyond the spirit of the present invention. Each embodiment may also be employed in appropriate combination with the other embodiments.

The present application claims priority to Patent Application No. 2011-262528 filed in Japan on Nov. 30, 2011 under the Paris Convention and provisions of national law in a designated State, the entire contents of which are hereby incorporated by reference.

REFERENCE SIGNS LIST 1, 2, 101, 102: insulating substrate
3, 103: common electrode
4, 104: black matrix (BM)
5, 105, 205: sub spacer
5a, 5b, 205a, 205b: end
6, 7, 106, 107: horizontal photo-alignment film
8, 108: liquid crystal molecule
10, 110: color filter substrate
11, 12, 111, 112: linear polarizer
13R, 13B, 13G: color filter
15: main spacer
20, 120: active matrix substrate
23: pixel electrode
30, 130: liquid crystal layer
a: first point
b: second point
c: third point

The invention claimed is:

1. A liquid crystal display device comprising:
a pair of substrates facing each other; and
a horizontal alignment type liquid crystal layer interposed between the pair of substrates, wherein
at least one of the pair of substrates includes a photo-alignment film,
one of the pair of substrates includes multiple sub spacers,
the multiple sub spacers are not in contact with the facing substrate under atmospheric pressure,
each of the multiple sub spacers includes a thickness in a cross section which monotonically increases and then monotonically decreases from one end to another end of the sub spacer,
the substrate on which the multiple sub spacers are provided further includes multiple main spacers,
the multiple main spacers are in contact with the facing substrate under atmospheric pressure,
the liquid crystal display device operates with an In-Plane Switching driving mode or a Fringe Field Switching driving mode,
each individual one of the multiple main spacers is defined by a single monolithic body,
a height of each of the multiple sub spacers is less than a height of each of the multiple main spacers,
an alignment film material that forms the photo-alignment film includes at least one photoreactive functional group selected from the group consisting of a chalcone group, a coumarin group, a cinnamato group, an azobenzene group, and a stilbene group, and
each of the multiple sub spacers has a bottom diameter of 80% or more and less than 100% of a bottom diameter of each of the multiple main spacers.

2. A liquid crystal display device comprising:
a pair of substrates facing each other; and
a horizontal alignment type liquid crystal layer interposed between the pair of substrates, wherein
at least one of the pair of substrates includes a photo-alignment film,
one of the pair of substrates includes multiple sub spacers,
the multiple sub spacers are not in contact with the facing substrate under atmospheric pressure, and
each of the multiple sub spacers includes a thickness in a cross section which monotonically increases up to a first point, monotonically decreases from the first point to a second point, monotonically increases from the second point to a third point, and then monotonically decreases from the third point, in a range from one end to another end of the sub spacer,
an angle defined between a line segment connecting the first point and the second point and a line segment connecting the second point and the third point is at least 168° and less than 180°,
the substrate on which the multiple sub spacers are provided further includes multiple main spacers,
the multiple main spacers are in contact with the facing substrate under atmospheric pressure,
the liquid crystal display device operates with an In-Plane Switching driving mode or a Fringe Field Switching driving mode, and
a height of each of the multiple sub spacers is less than a height of each of the multiple main spacers.

3. The liquid crystal display device according to claim 2, wherein an alignment film material to form the photo-alignment film comprises at least one photoreactive functional group selected from the group consisting of a chalcone group, a coumarin group, a cinnamato group, an azobenzene group, and a stilbene group.

4. The liquid crystal display device according to claim 3, further comprising a polymer layer that is formed by polymerization of a monomer contained in the liquid crystal layer and that has an alignment regulating force, on the liquid crystal layer side of the photo-alignment film.

5. The liquid crystal display device according to claim 3, wherein each of the multiple sub spacers has a bottom diameter of 80% or more and less than 100% of a bottom diameter of each of the multiple main spacers.

6. The liquid crystal display device according to claim 2, wherein an alignment film material to form the photo-alignment film includes a cyclobutane skeleton in a repeating unit.

7. The liquid crystal display device according to claim 2, wherein the photo-alignment film includes a main chain structure of at least one polymer selected from the group consisting of polyimides, polyamic acids, polymaleimides, and polysiloxanes.

8. The liquid crystal display device according to claim 2, wherein one of the pair of substrates comprises a color filter.

9. The liquid crystal display device according to claim 2, wherein one of the pair of substrates comprises an IGZO-TFT.

10. The liquid crystal display device according to claim 2, wherein the photo-alignment film is not provided on the multiple sub spacers or has a smaller thickness on the multiple sub spacers than in a portion surrounding the multiple sub spacers.

11. The liquid crystal display device according to claim 2, wherein
the substrate on which the multiple sub spacers are provided further comprises a black matrix, the multiple sub spacers and the multiple main spacers are each provided in a dot-shaped manner on the black matrix between sub pixels that are adjacent to each other.

* * * * *